(12) United States Patent
Lahann et al.

(10) Patent No.: US 9,482,861 B2
(45) Date of Patent: Nov. 1, 2016

(54) OPTICAL DEVICES WITH SWITCHABLE PARTICLES

(75) Inventors: Joerg Lahann, Ann Arbor, MI (US); Sang-yeul Hwang, Ann Arbor, MI (US); Jaewon Yoon, Ann Arbor, MI (US); Srijanani Bhaskar, Boothwyn, PA (US); Kyungjin Lee, Daejeon (KR); Tae-Hong Park, Daejeon (KR)

(73) Assignee: The Regents Of The University Of Michigan, Ann Arbor, MI (US)

( * ) Notice: Subject to any disclaimer, the term of this patent is extended or adjusted under 35 U.S.C. 154(b) by 421 days.

(21) Appl. No.: 13/880,826

(22) PCT Filed: Oct. 21, 2011

(86) PCT No.: PCT/US2011/057305
§ 371 (c)(1),
(2), (4) Date: Aug. 28, 2013

(87) PCT Pub. No.: WO2012/054841
PCT Pub. Date: Apr. 26, 2012

(65) Prior Publication Data
US 2013/0329275 A1 Dec. 12, 2013

Related U.S. Application Data

(60) Provisional application No. 61/405,893, filed on Oct. 22, 2010.

(51) Int. Cl.
*G02B 26/00* (2006.01)
*G02B 26/08* (2006.01)
(Continued)

(52) U.S. Cl.
CPC ............... *G02B 26/026* (2013.01); *G02F 1/09* (2013.01); *G09F 9/375* (2013.01)

(58) Field of Classification Search
USPC ....... 359/237, 242, 246, 247, 290–292, 295, 359/296, 298
See application file for complete search history.

(56) References Cited

U.S. PATENT DOCUMENTS

| | | |
|---|---|---|
| 3,060,429 A | 10/1962 | Winston |
| 4,621,268 A | 11/1986 | Keeling et al. |

(Continued)

FOREIGN PATENT DOCUMENTS

| | | |
|---|---|---|
| EP | 1809719 A2 | 7/2007 |
| EP | 2285889 A1 | 2/2011 |

(Continued)

OTHER PUBLICATIONS

Cayre, Olivier, et al., "Fabrication of dipolar colloid particles by microcontact printing," Chem. Commun., pp. 2296-2297 (2003) (first published online Aug. 5, 2003).

(Continued)

*Primary Examiner* — Joseph P Martinez
*Assistant Examiner* — Brandi Thomas
(74) *Attorney, Agent, or Firm* — Harness, Dickey & Pierce, PLC

(57) ABSTRACT

Optical display devices and methods of operating such devices are provided. The optical device includes a display component having a plurality of anisotropic multiphasic particles with at least two optically distinct phases. The plurality of anisotropic multiphasic particles is disposed in one or more regions of the display component that define an optic feature. Further, at least one of the phases of the anisotropic multiphasic particle comprises a material receptive to a force field, such as a magnetic material is receptive to an applied magnetic field. In this manner, the display component can reversibly exhibit a first optical state in the presence of the force field and thus is optionally switchable.

13 Claims, 17 Drawing Sheets

(51) Int. Cl.
  *G02F 1/29* (2006.01)
  *G02B 26/02* (2006.01)
  *G02F 1/09* (2006.01)
  *G09F 9/37* (2006.01)

(56) References Cited

U.S. PATENT DOCUMENTS

| | | | |
|---|---|---|---|
| 5,464,634 | A | 11/1995 | Kossovsky et al. |
| 5,560,543 | A | 10/1996 | Smith et al. |
| 5,635,207 | A | 6/1997 | Grinstaff et al. |
| 5,741,138 | A | 4/1998 | Rice et al. |
| 5,792,067 | A | 8/1998 | Karell |
| 5,813,614 | A | 9/1998 | Coffee |
| 6,007,845 | A | 12/1999 | Domb et al. |
| 6,055,091 | A | 4/2000 | Sheridon et al. |
| 6,063,365 | A | 5/2000 | Shefer et al. |
| 6,107,102 | A | 8/2000 | Ferrari |
| 6,132,702 | A | 10/2000 | Witt et al. |
| 6,252,129 | B1 | 6/2001 | Coffee |
| 6,267,724 | B1 | 7/2001 | Taylor |
| 6,306,993 | B1 | 10/2001 | Rothbard et al. |
| 6,391,471 | B1 | 5/2002 | Hiraoka et al. |
| 6,491,902 | B2 | 12/2002 | Shefer et al. |
| 6,548,264 | B1 | 4/2003 | Tan et al. |
| 6,589,562 | B1 | 7/2003 | Shefer et al. |
| 6,596,296 | B1 | 7/2003 | Nelson et al. |
| 6,685,921 | B2 | 2/2004 | Lawlor |
| 6,703,235 | B2 | 3/2004 | Luebke et al. |
| 6,766,817 | B2 | 7/2004 | da Silva et al. |
| 6,811,090 | B2 | 11/2004 | Yogi et al. |
| 6,825,161 | B2 | 11/2004 | Shefer et al. |
| 6,918,404 | B2 | 7/2005 | Dias da Silva et al. |
| 7,066,586 | B2 | 6/2006 | da Silva et al. |
| 7,119,161 | B2 | 10/2006 | Lawandy |
| 7,413,868 | B2 | 8/2008 | Kauvar et al. |
| 7,446,084 | B2 | 11/2008 | Barthel et al. |
| 7,947,772 | B2 * | 5/2011 | Lahann et al. ............... 524/424 |
| 8,043,480 | B2 | 10/2011 | Lahann et al. |
| 8,052,849 | B2 | 11/2011 | Lahann et al. |
| 8,187,708 | B2 | 5/2012 | Lahann et al. |
| 8,241,651 | B2 | 8/2012 | Lahann |
| 2007/0054119 | A1 | 3/2007 | Garstecki et al. |
| 2007/0061893 | A1 | 3/2007 | Black et al. |
| 2007/0077276 | A1 | 4/2007 | Haynie |
| 2007/0112180 | A1 | 5/2007 | Gray et al. |
| 2007/0167340 | A1 | 7/2007 | Barthel et al. |
| 2007/0195236 | A1* | 8/2007 | Kim et al. ............... 349/114 |
| 2007/0231355 | A1 | 10/2007 | Quadir et al. |
| 2007/0232169 | A1 | 10/2007 | Strickler et al. |
| 2007/0237800 | A1 | 10/2007 | Lahann |
| 2008/0105550 | A1* | 5/2008 | Misawa et al. ............... 204/600 |
| 2008/0241228 | A1 | 10/2008 | Haynie |
| 2008/0241242 | A1 | 10/2008 | Caruso et al. |
| 2010/0015447 | A1 | 1/2010 | Lahann et al. |
| 2010/0028994 | A1 | 2/2010 | DeSimone et al. |
| 2010/0038830 | A1 | 2/2010 | Lahann et al. |
| 2010/0136706 | A1 | 6/2010 | Miyata et al. |
| 2010/0255581 | A1 | 10/2010 | Naqvi et al. |
| 2011/0278425 | A1 | 11/2011 | Park |
| 2012/0045487 | A1 | 2/2012 | Lahann et al. |
| 2013/0115169 | A1 | 5/2013 | Lahann et al. |
| 2013/0329275 | A1 | 12/2013 | Lahann et al. |
| 2014/0147510 | A1 | 5/2014 | Lahann et al. |

FOREIGN PATENT DOCUMENTS

| | | |
|---|---|---|
| JP | 2002-258329 A | 9/2002 |
| JP | 2003155504 A | 5/2003 |
| JP | 2004-505761 A | 2/2004 |
| JP | 2005504090 A | 2/2005 |
| JP | 2008520407 A | 6/2008 |
| JP | 4690418 B2 | 6/2011 |
| WO | 02/13786 A2 | 2/2002 |
| WO | 03/026611 | 4/2003 |
| WO | 2006/003403 | 1/2006 |
| WO | WO 2006/137936 A2 | 12/2006 |
| WO | 2007/149310 | 12/2007 |
| WO | 2009/055693 A2 | 4/2009 |
| WO | 2009/151421 A1 | 12/2009 |
| WO | 2010/011641 A2 | 1/2010 |
| WO | 2010/032971 A2 | 3/2010 |
| WO | 2010/127119 A2 | 11/2010 |
| WO | 2011/069082 A2 | 6/2011 |
| WO | 2012/054841 A2 | 4/2012 |
| WO | 2012/058464 A2 | 5/2012 |

OTHER PUBLICATIONS

Erhardt, R., et al., "Amphiphilic Janus Micelles with Polystyrene and Poly(methacrylic acid) Hemispheres," J. Am. Chem. Soc., vol. 125, pp. 3260-3267 (2003) (published online Feb. 21, 2003).

Erhardt, Rainer, et al., "Janus Micelles," Macromolecules, vol. 34, No. 4, pp. 1069-1075 (2001) (published online Jan. 17, 2001).

Perro, Adeline et al., "Design and synthesis of Janus micro- and nanoparticles," Journal of Materials Chemistry., vol. 15, pp. 3745-3760 (2005) (published online Jul. 25, 2005).

Paunov, V., et al., "Novel Technique for Preparation of Dipolar Microparticles by Polymerization of Polarised Emulsions," Abstract Central, 2004 Fall Meeting, GG: Mesoscale Architectures from Nano-Units-Assembly, Fabrication, and Properties, 1 page (Nov. 30, 2004).

Barrero, A. et al., "Micro- and Nanoparticles via Capillary Flows," Annu. Rev. Fluid Mech., vol. 39, pp. 89-106 (2007).

Farokhzad, Omar C., et al., "Nanoparticle-Aptamer Bioconjugates: A New Approach for Targeting Prostate Cancer Cells," Cancer Research, vol. 64, pp. 7668-7672 (Nov. 1, 2004).

Guo, Ketai, et al., "Aptamer-based capture molecules as a novel coating strategy to promote cell adhesion," J. Cell. Mol. Med., vol. 9, No. 3, pp. 731-736 (2005).

Hicke, Brian J., et al., "Tumor Targeting by an Aptamer," J. of Nuclear Med., vol. 47, No. 4, pp. 668-678 (Apr. 2006).

Larsen, Gustavo, et al., "A Method for Making Inorganic and Hybrid (Organic/Inorganic) Fibers and Vesicles with Diameters in the Submicrometer and Micrometer Range via Sol-Gel Chemistry and Electrically Forced Liquid Jets," J. Am. Chem. Soc., vol. 125, pp. 1154-1155 (2003) (published online Jan. 7, 2003).

Loscertales, Ignacio G., et al., "Electrically Forced Coaxial Nanojets for One-Step Hollow Nanofiber Design," J. Am. Chem. Soc., vol. 126, pp. 5376-5377 (2004).

Loscertales, Ignacio G., et al., "Production of complex nano-structures by electro-hydro-dynamics," Mater. Res. Soc. Symp. Proc., vol. 860E, pp. LL5.9.1-LL5.9.6 (2005).

Marín, Álvaro G., et al., "Simple and Double Emulsions via Coaxial Jet Electrosprays," Physical Review Letters, vol. 98, pp. 014502-1 to 014502-4 (Jan. 5, 2007).

Roh, Kyung-Ho, et al., "Triphasic Nanocolloids," J. Am. Chem. Soc., vol. 128, No. 21, pp. 6796-6797 (2006) (published online May 5, 2006).

Uhrich, Kathryn E., et al., "Polymeric Systems for Controlled Drug Release," Chem. Rev., vol. 99, pp. 3181-3198 (1999).

Cloupeau, Michel, et al., "Electrohydrodynamic spraying functioning modes: A critical-review," J. Aerosol Sci., vol. 25, No. 6, pp. 1021-1036 (1994).

Cloupeau, M., et al., "Electrostatic spraying of liquids: Main functioning modes," J. Electrostatics, vol. 25 pp. 165-184 (1990).

De La Mora, J. Fernandez, et al., "The current emitted by highly conducting Taylor cones," J. Fluid Mech., vol. 260, pp. 155-184 (1994).

Fridrikh, Sergey V., et al., "Controlling the Fiber Diameter during Electrospinning," Phys. Rev. Lett., vol. 90, No. 14, pp. 144502-1 to 144502-4 (Apr. 8, 2003).

Gomez, Alessandro, et al., "Charge and fission of droplets in electrostatic sprays," Phys. Fluids, vol. 6, No. 1, pp. 404-414 (Jan. 1994).

Hohman, Moses M., et al., "Electrospinning and electrically forced jets. II. Applications," Physics of Fluids, vol. 13, No. 8, pp. 2221-2236 (Aug. 2001).

(56) References Cited

OTHER PUBLICATIONS

Hohman, Moses M., et al., "Electrospinning and electrically foreced jets. I.Stability Theory," Physics of Fluids, vol. 13, No. 8, pp. 2201-2220 (Aug. 2001).
Loscertales, I. G., et al., "Micro/Nano Encapsulation via Electrified Coaxial Liquid Jets," Science, vol. 295, No. 5560, pp. 1695-1698 (Mar. 1, 2002).
Rosell-Llompart, J. et al., "Generation of Monodisperse Droplets 0.3 to 4 ?m in Diameter from Electrified Cone-Jets of Highly Conducting and Viscous Liquids," J. Aerosol Sci., vol. 25, No. 6, pp. 1093-1119 (1994).
Shin, Y. M., et al., "Electrospinning: A whipping fluid jet generates submicron polymer fibers," Appl. Phys. Lett, vol. 78, No. 8, pp. 1149-1151 (Feb. 19, 2001).
Sun, Zaicheng, et al., "Compound Core-Shell Polymer Nanofibers by Co-Electrospinning," Adv. Mater., vol. 15, No. 22, pp. 1929-1932 (Nov. 17, 2003).
Zeleny, John, "Instability of Electrified Liquid Surfaces," Phys. Rev., Second Series, vol. 10, No. 1, pp. 1-6 (Jul. 1917).
Huang, Zheng-Ming, et al., "A review on polymer nanofibers by electrospinning and their applications in nanocomposites," Comp. Sci. Tech., vol. 63, pp. 2223-2253 (2003).
Nisisako, Takasi, et al., "Synthesis of Monodisperse Bicolored Janus Particles with Electrical Anisotropy Using a Microfluidic Co-Flow System," Adv. Mater., vol. 18, pp. 1152-1156 (2006).
Nie, Zhihong, et al., "Janus and Ternary Particles Generated by Microfluidic Synthesis: Design, Synthesis, and Self-Assembly," J. Am. Chem. Soc., vol. 128, pp. 9408-9412 (2006).
Binks, B. P. et al., "Particles Adsorbed at the Oil-Water Interface: A Theoretical Comparison between Spheres of Uniform Wettability and 'Janus' Particles," Langmuir, vol. 17, pp. 4708-4710 (2001) (published online Jul. 3, 2001).
Takei, H. et al., "Gradient Sensitive Microscopic Probes Prepared by Gold Evaporation and Chemisorption on Latex Spheres," Langmuir, vol. 13, No. 7, pp. 1865-1868 (Apr. 2, 1997).
Shepherd, Robert F., et al., "Microfluidic Assembly of Homogeneous and Janus Colloid-Filled Hydrogel Granules," Langmuir, vol. 22, pp. 8618-8622 (2006) (published online Sep. 15, 2006).
Casagrande, C. et al., "<<Janus Beads>>: Realization and Behaviour at Water/Oil Interfaces," Europhys. Lett., vol. 9, No. 3, pp. 251-255 (Jun. 1, 1989).
Berkland, Corey et al., "Controlling surface nano-structure using flow-limited field-injection electrostatic spraying (FFESS) of poly(D,L-lactide-co-glycolide)," Biomaterials, vol. 25, No. 25, pp. 5649-5658, (Nov. 2004).
Bhaskar, Srijanani, et al., "Engineering, Characterization and Directional Self-Assembly of Anisotropically Modified Nanocolloids," Small, vol. 7, No. 6, pp. 812-819 (2011) (first published online Feb. 8, 2011).
Bhaskar, Srijanani, et al., "Microstructured Materials Based on Multicompartmental Fibers," J. Am. Chem. Soc., vol. 131, No. 19, pp. 6650-6651 (2009) (first published online Apr. 29, 2009).
Bhaskar, Srijanani, et al., "Multicompartmental Microcylinders," Angewandte Chemie Int. Ed., vol. 48, No. 25, pp. 4589-4593 (Jun. 8, 2009) (first published online May 15, 2009).
Bhaskar, Srijanani, et al., "Spatioselective Modification of Bicompartmental Polymer Particles and Fibers via Huisgen 1,3-Dipolar Cycloaddition," Macromolecular Rapid Communications, vol. 29, No. 20, pp. 1655-1660 (Oct. 22, 2008) (first published online Sep. 12, 2008).
Bhaskar, Srijanani, et al., "Towards Designer Microparticles: Simultaneous Control of Anisotropy, Shape, and Size," Small, vol. 6, No. 3, pp. 404-411 (2010) (first published online Nov. 20, 2009).
Doshi, Nishit, et al., "Red blood cell-mimicking synthetic biomaterial particles," PNAS, vol. 106, No. 51, pp. 21495-21499 (Dec. 22, 2009).
Gunatillake, Pathiraja A., et al., "Biodegradable Synthetic Polymers for Tissue Engineering," European Cells and Materials, vol. 5, pp. 1-16 (2003).

Gupta, Pankaj, et al, "Some investigations on the fiber formation by utilizing a side-by-side bicomponent electrospinning approach," Polymer, vol. 44, pp. 6353-6359 (2003).
Hwang, Sangyeul, et al., "Anisotropic hybrid particles based on electrohydrodynamic co-jetting of nanoparticle suspensions," Physical Chemistry Chemical Physics, vol. 12, pp. 11894-11899 (2010) (published online Sep. 15, 2010).
Kazemi, Abbass, et al., "Environmentally Responsive Core/Shell Particles via Electrohydrodynamic Co-jetting of Fully Miscible Polymer Solutions," Small, vol. 4, No. 10, pp. 1756-1762 (2008).
Lahann, Joerg, et al., "Biphasic nanoparticles made by electrified jetting," Mar. 2005 Meeting of the American Physical Society (Mar. 22, 2005). Abstract only.
Lahann, Joerg, "Recent Progress in Nano-biotechnology: Compartmentalized Micro- and Nanoparticles via Electrohydrodynamic Co-jetting," Small, vol. 7, No. 9, pp. 1149-1156 (May 9, 2011) (first published online Apr. 8, 2011).
Lee, Kyung Jin, et al., "Compartmentalized Photoreactions within Compositionally Anisotropic Janus Microstructures," Macromolecular Rapid Communications, vol. 32, pp. 431-437 (2011) (published online Dec. 10, 2010).
Mandal, Suparna, et al., "Micropatterned Fiber Scaffolds for Spatially Controlled Cell Adhesion," Macromolecular Rapid Communications, vol. 30, pp. 1638-1644 (2009) (published online Jul. 29, 2009).
Mo, X., et al., "PCL-PGLA composite tubular scaffold preparation and biocompatibility investigation," Int. J. Artif. Organs, vol. 29, No. 8, pp. 790-799 (Aug. 2006). Abstract only.
Moffat, Kristen L., et al., "Novel Nanofiber-Based Scaffold for Rotator Cuff Repair and Augmentation," Tissue Engineering: Part A, vol. 15, No. 1, pp. 115-126 (Jan. 2009) (published online Sep. 13, 2008).
Moffat, Kristen L., et al., "Orthopedic Interface Tissue Engineering for the Biological Fixation of Soft Tissue Grafts," Clinics in Sports Medicine, vol. 28, No. 1, pp. 157-176 (Jan. 2009).
Palm, Lars, et al., "An Optical Method for Measuring Drop Flight Stability in a Continuous Ink Jet," Journal of Imaging Science and Technology, vol. 41, No. 1, pp. 48-53 (Jan./Feb. 1997).
Rodenberg, Eric J., et al., "Peptides Derived from Fibronectin Type III Connecting Segments Promote Endothelial Cell Adhesion but Not Platelet Adhesion: Implications in Tissue-Engineered Vascular Grafts," Tissue Engineering, vol. 13, No. 11, pp. 2653-2666 (2007).
Roh, Kyung-Ho, et al., "Water-Stable Biphasic Nanocolloids with Potential Use as Anisotropic Imaging Probes," Langmuir, vol. 23, No. 10, pp. 5683-5688 (2007) (published online Jan. 10, 2007).
Sun, Qiang, et al., "Design of Janus Nanoparticles with Atomic Precision," Mar. 2008 Meeting of the American Physical Society (Mar. 13, 2008). Abstract only.
Wako Pure Chemical Industries, Ltd., Biodegradable Polymers (PLA-PLGA), <http://www.wako-chem.co.jp/specialty/plga/index.htm>.
Yoshida, Mutsumi, et al., "Short-term biocompatibility of biphasic nanocolloids with potential use as anisotropic imaging probes," Biomaterials, vol. 28, pp. 2446-2456 (2007) (published online Feb. 20, 2007).
International Search Report and Written Opinion of the International Searching Authority issued on Jan. 13, 2011 for PCT/US2010/032971 (published as WO 2010/127119).
International Preliminary Report on Patentability issued on Nov. 1, 2011 for PCT App. No. PCT/US2010/032971 (published as WO 2010/127119).
International Search Report and Written Opinion of the International Searching Authority issued on Jul. 23, 2009 for PCT App. No. PCT/US2008/081145 (published as WO 09/055693).
International Preliminary Report on Patentability issued on Apr. 27, 2010 for PCT App. No. PCT/US2008/081145 (published as WO 09/055693).
International Search Report and Written Opinion of the International Searching Authority issued on Apr. 3, 2007 for PCT App. No. PCT/US2005/040560 (published as WO 06/137936).
International Preliminary Report on Patentability issued on May 15, 2007 for PCT App. No. PCT/US2005/040560 (published as WO 06/137936).

(56) References Cited

OTHER PUBLICATIONS

International Search Report and Written Opinion of the International Searching Authority issued on Jul. 21, 2008 for PCT App. No. PCT/US2007/014028 (published as WO 07/149310).

International Preliminary Report on Patentability issued on Dec. 16, 2008 for PCT App. No. PCT/US2007/014028 (published as WO 07/149310).

International Search Report and Written Opinion of the International Searching Authority issued on Mar. 11, 2009 for PCT App. No. PCT/US2008/007372 (published as WO 09/151421).

International Preliminary Report on Patentability issued on Dec. 13, 2010 for PCT App. No. PCT/US2008/007372 (published as WO 09/151421).

International Search Report and Written Opinion of the International Searching Authority issued on Mar. 8, 2010 for PCT App. No. PCT/US2009/051238 (published as WO 2010/011641).

International Preliminary Report on Patentability issued on Jan. 25, 2011 for PCT App. No. PCT/US2009/051238 (published as WO 2010/011641).

Supplemental European Search Report Issued Mar. 11, 2011 for PCT/US2005/040560 (Published as WO/06/137936).

Gourevich, I. et al. Multidye Nanostructural Material for Optical Data Storage and Security Labeling. Chem Mater, vol. 16, No. 8, Mar. 26, 2004. pp. 1472-1479. p. 1473-p. 1475; Figure 1*.

Georgieva, R., et al. "Permability and Conductivity of Red Blood Cell Templated Polyectrolyte Capsules Coated with Supplementary Layers", 2004, Langmuir, pp. 1895-1900.

An Introduction to Bicomponent Fibers. www.hillsinc.net/articles/bicointro.htm. Feb. 14, 2014.

Y. Osada, et al., "Soft and Wet Materials: Polymer Gels," Advanced Materials 1998, vol. 10, No. 11, pp. 827-837.

International Search Report (3 pages) and Written Opinion of the ISA (2 pages) for PCT/US2011/058142, ISA/KR, mailed May 16, 2012.

Duan, Li, et al., "Hemoglobin protein hollow shells fabricated through covalent layer-by-layer technique," Biochemical and Biophysical Research Communications, vol. 354, No. 2, pp. 357-362 (Mar. 9, 2007) (published online Jan. 10, 2007).

International Search Report and Written Opinion of the International Searching Authority for PCT Application No. PCT/US2010/058921 (Pub. No. WO 2011/069082) mailed on Aug. 29, 2011.

International Preliminary Report on Patentability for PCT Application No. PCT/US2010/058921 (Pub. No. WO 2011/069082) mailed Jun. 5, 2012.

Shutava, T.G., et al., "Layer-by-Layer Enzyme/Polyelectrolyte Films as a Functional Protective Barrier in Oxidizing Media," J. Am. Chem. Soc., vol. 128, No. 30, pp. 9926-9934 (2006).

International Search Report (2 pages) and Written Opinion of the ISA (4 pages), ISA/KR, mailed Jun. 29, 2012.

Roh, K. et al., "Biphasic Janus particles with nanoscale anisotropy," Nature Mater., vol. 4, pp. 759-763 (2005).

* cited by examiner

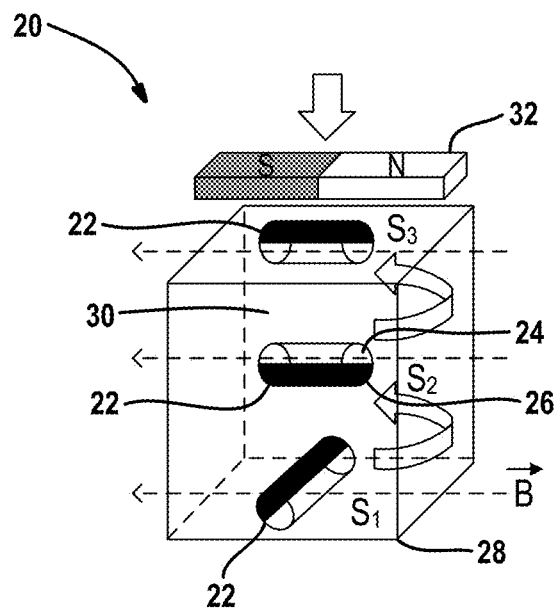
FIG. 1A
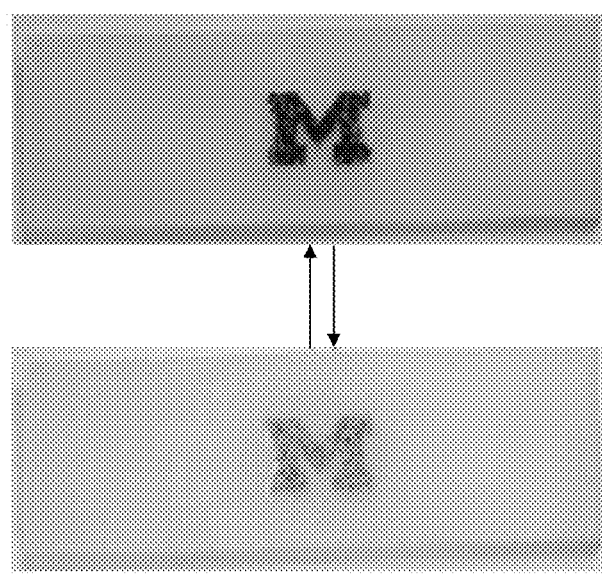
FIG. 1B
FIG. 1C

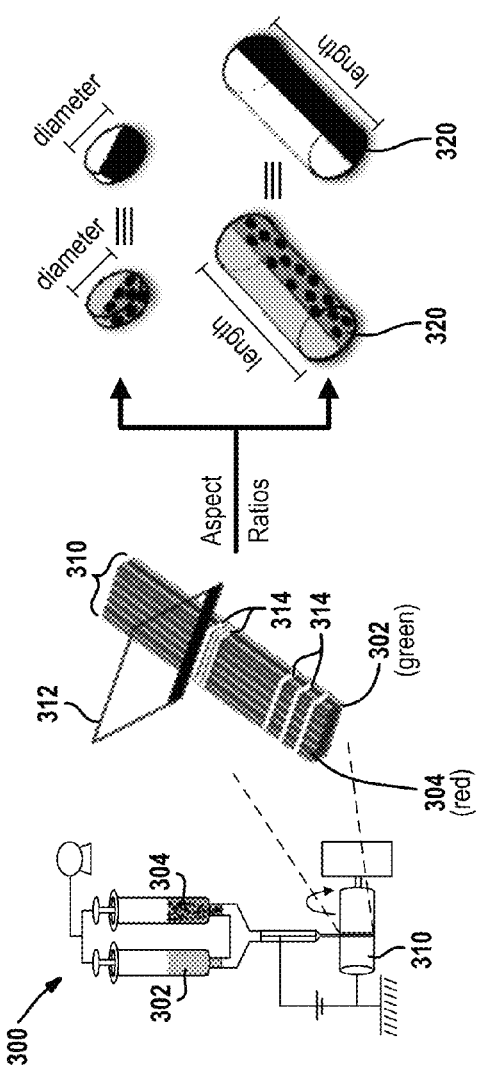
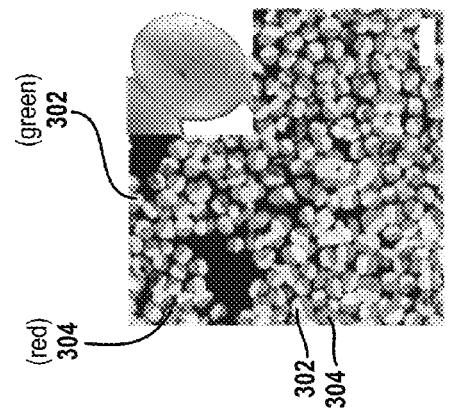
FIG. 9A
FIG. 9B

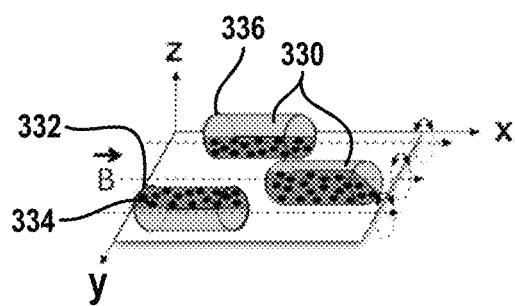
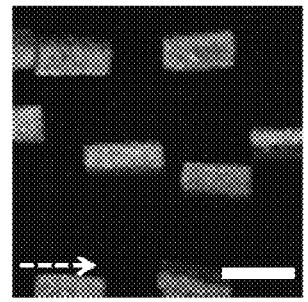
FIG. 10A
FIG. 10B
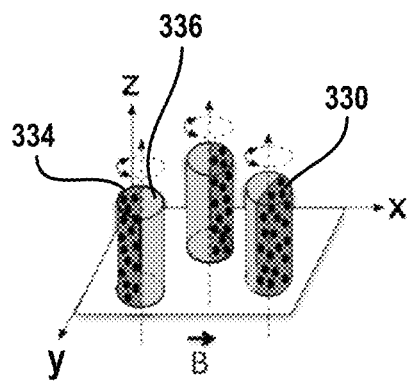
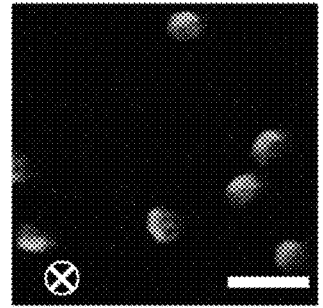
FIG. 10C
FIG. 10D

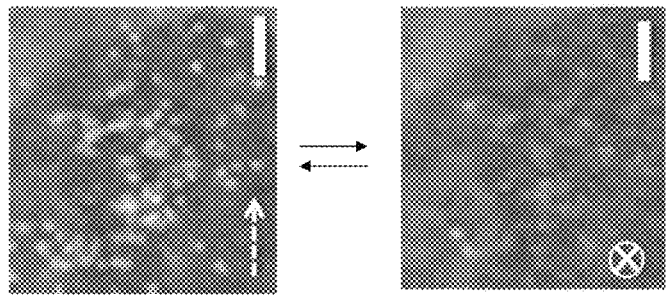
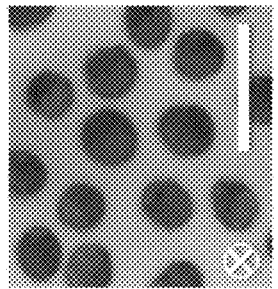
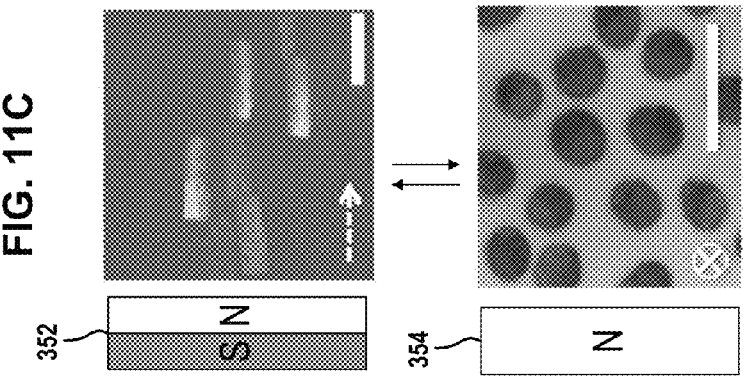
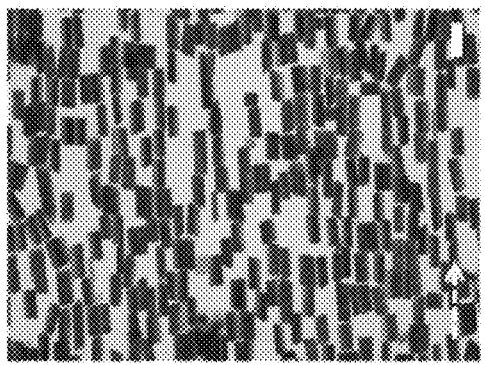
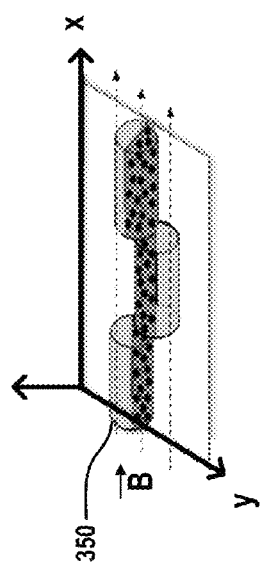

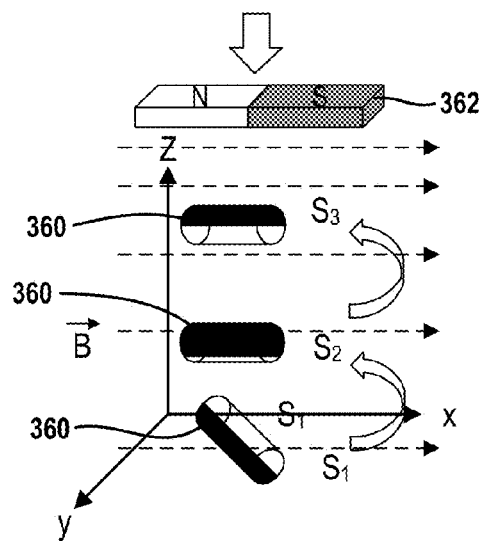
FIG. 12A
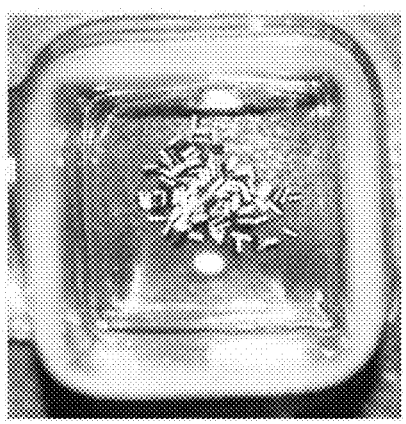 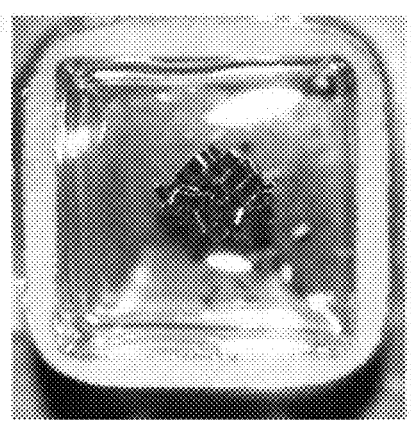
FIG. 12B  FIG. 12C

FIG. 12D
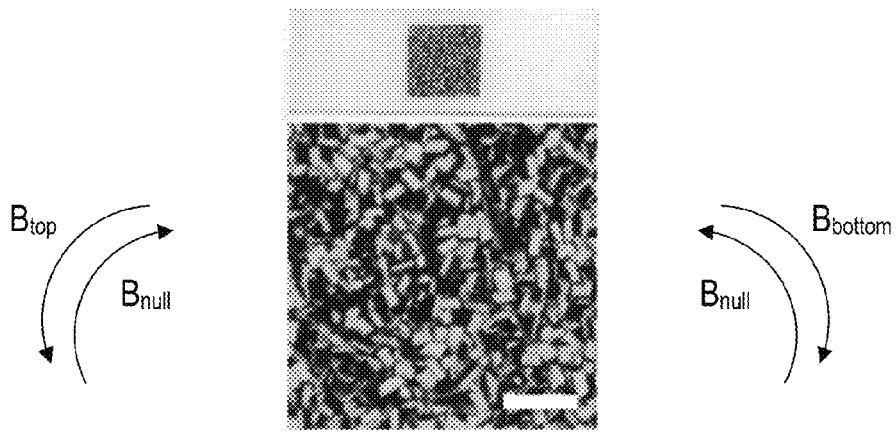
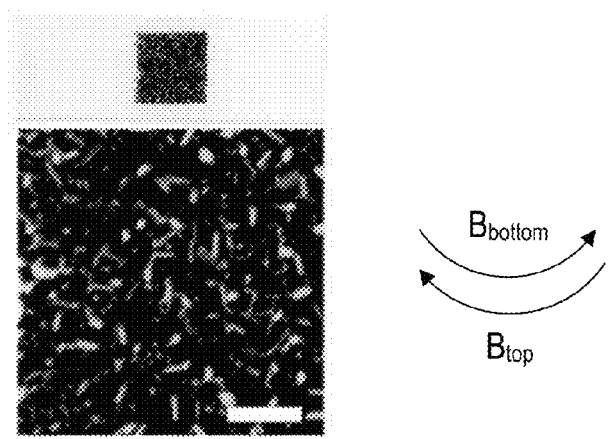
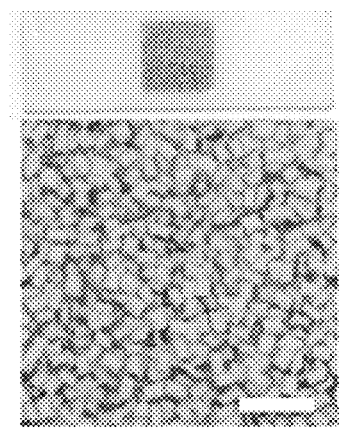
FIG. 12E          FIG. 12F

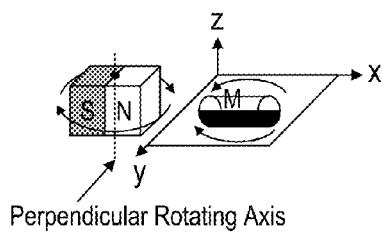
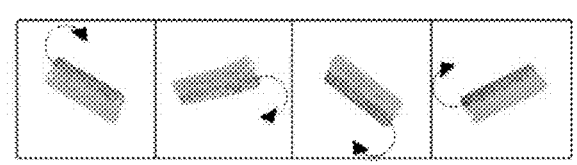
FIG. 17A  FIG. 17B
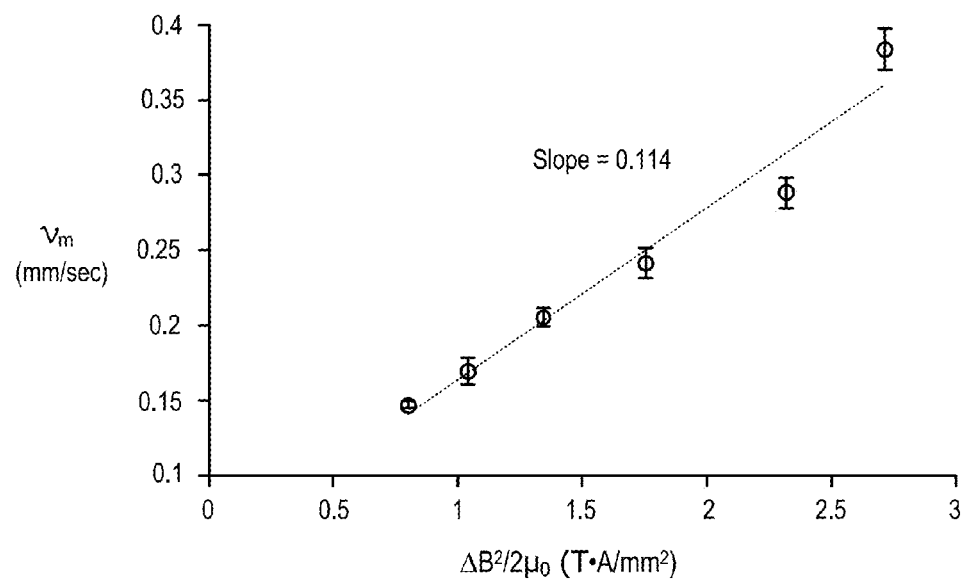
FIG. 18

OPTICAL DEVICES WITH SWITCHABLE PARTICLES

CROSS-REFERENCE TO RELATED APPLICATIONS

This application is a National Stage of International Application No. PCT/US2011/057305, filed Oct. 21, 2011, which claims the benefit of U.S. Provisional Application No. 61/405,893, filed on Oct. 22, 2010. The entire disclosures of each of the above applications are incorporated herein by reference.

FIELD

The present disclosure relates to devices and methods of using particles that are responsive to an external force field to generate optical displays, including methods and devices that employ magnetically switchable particles responsive to magnetic fields to create optical displays.

BACKGROUND

This section provides background information related to the present disclosure which is not necessarily prior art.

Optical or visual displays are used in a wide variety of applications, including in display panels, display devices, electronic paper, screens, monitors, sensors, and the like. There is a need for low cost, high resolution, switchable optic display components in such optic display devices. In this regard, anisotropic micro-particles and nano-particles can be useful for color or optical applications, where the special properties of the resulting pigments (amphiphilic, controlled pigment shapes, nano-scale design) lead to their usefulness in paints, displays or electronic paper, for example. In various aspects, the present teachings provide optic display devices that incorporate such anisotropic multiphasic/multi-compartment particles, such as biphasic nanoparticles, comprising one or more optically distinct phases that define optic features in the display device according to the present disclosure. The color of the optic feature created by such anisotropic multiphasic particles can be readily and reversibly controlled in the presence of an external force field, such as a magnetic field.

SUMMARY

This section provides a general summary of the disclosure, and is not a comprehensive disclosure of its full scope or all of its features.

In various aspects, the present disclosure pertains to optical display devices. For example, in one embodiment, an optical device comprises a display component. The display component comprises a plurality of anisotropic multiphasic particles that defines an optic feature. An anisotropic multiphasic particle of the plurality comprises a first phase and at least one additional phase distinct from the first phase. The first phase comprises a first colorant so that the anisotropic multiphasic particle defines optically distinct phases. At least one of the first phase or the one or more additional phases comprises a material receptive to a force field, so that the display component reversibly exhibits a first optical state in the presence of the force field.

In certain aspects, the at least one additional phase comprises a second colorant distinct from the first colorant. In certain other aspects, the optical device comprises a force field generator that generates and transmits the force field to the display component. The force field is optionally selected from the group consisting of: an electric field, a magnetic field, pressure, sonication, light, and combinations thereof.

In other variations, the present disclosure provides a magnetically switchable optical device. The magnetically switchable optical device comprises a display component that comprises a plurality of anisotropic multiphasic particles that define an optic feature. An anisotropic multiphasic particle of the plurality of anisotropic multiphasic particles comprises a first phase and at least one additional phase distinct from the first phase. The first phase of the anisotropic multiphasic particle comprises a first colorant, so as to define optically distinct phases. Further, at least one of the first phase and the one or more additional phases comprises a magnetic material receptive to a magnetic force field, so that the display component reversibly exhibits a first optical state in the presence of the magnetic force field.

In yet other aspects, method of reversibly switching particle orientation for an optic display are provided. Such a method may comprise transmitting a magnetic force field to a display component that comprises a plurality of anisotropic multiphasic particles disposed in one or more regions that define an optic feature. An anisotropic multiphasic particle comprises a first phase and at least one additional phase distinct from the first phase. The first phase comprises a first colorant and the at least one additional phase comprises a second colorant distinct from the first colorant, thus forming an anisotropic multiphasic particle having optically distinct phases. At least one of the first phase and the at least one additional phase comprises a magnetic material receptive to the magnetic force field, wherein during or after the transmitting of the magnetic force field the display component reversibly exhibits a first optical state.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 1A-1C: (1A) A schematic demonstrating principles of color switching with exemplary magnetic bi-compartmentalized multiphasic microcylinders by approaching a top of a cell or device containing magnetic bi-compartmentalized microcylinders (with optically distinct compartments or phases) with a magnet having a parallel magnetic pole, showing that the magnetite-containing phase of particles migrates toward the external magnet due to its lower potential energy, while the longer side of particle orientates onto the horizontal plane (magnetic field direction); (1B) shows that when the magnet is positioned at the top of a demonstrator cell or device, a large population of multiphasic microcylinders synchronize their magnetic compartments and move toward the top to represent a black optical color of letter "M"; (1C) as the magnet is placed at the bottom of the demonstrator cell, the multiphasic microcylinders migrate downward to uncover the yellow optical color of letter "M";

Figure 4:
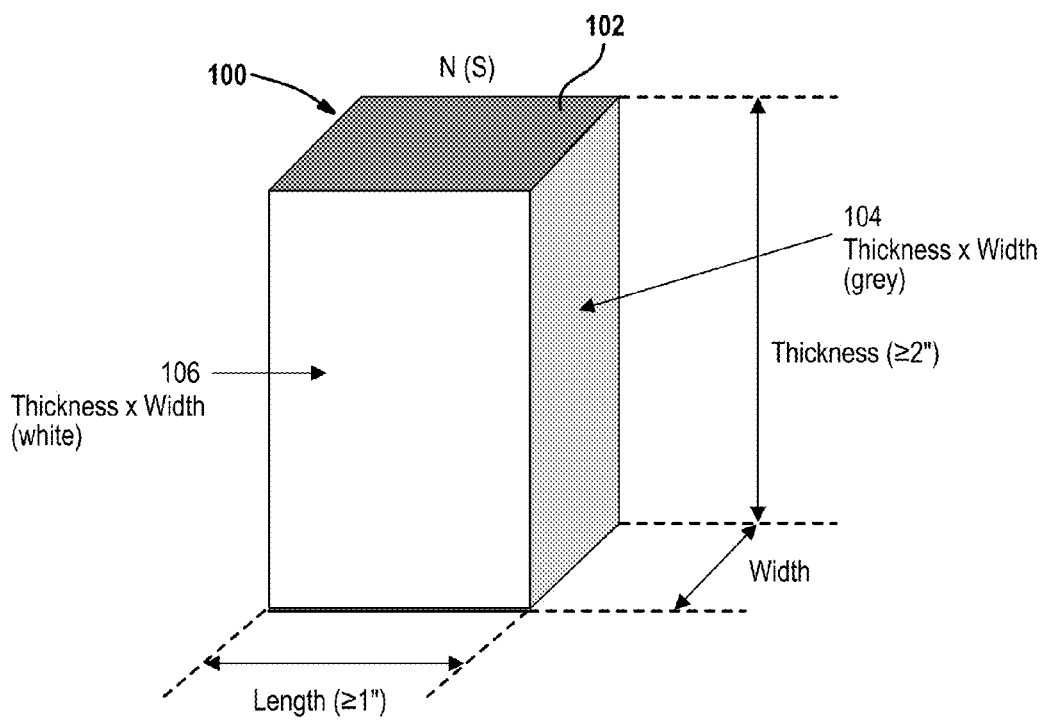
Figure 5A:
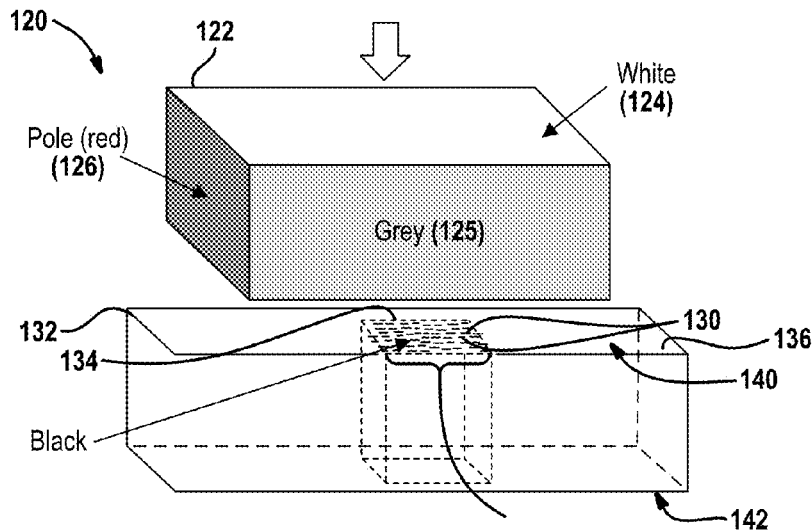
Figure 5B:
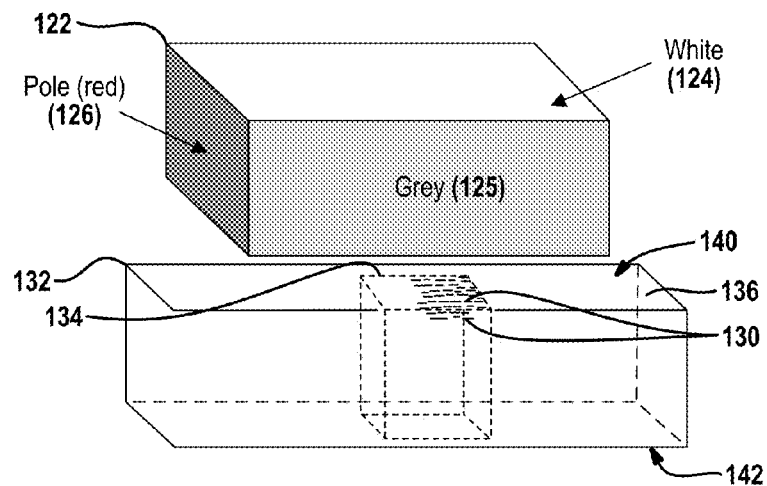
Figure 6:
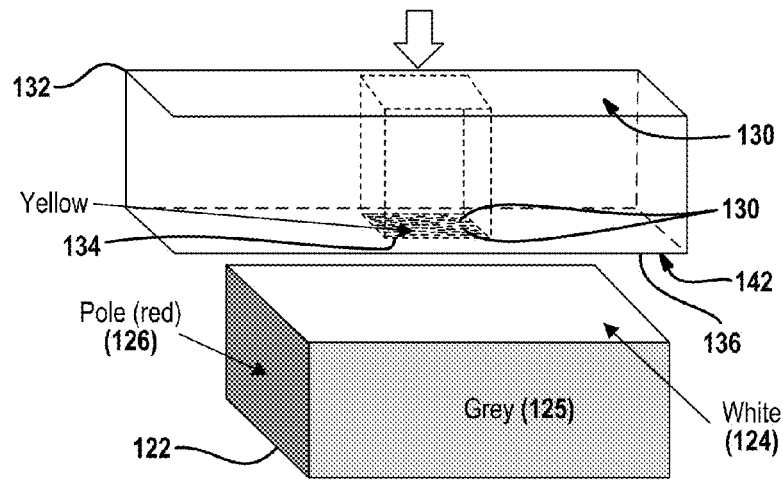
Figure 7:
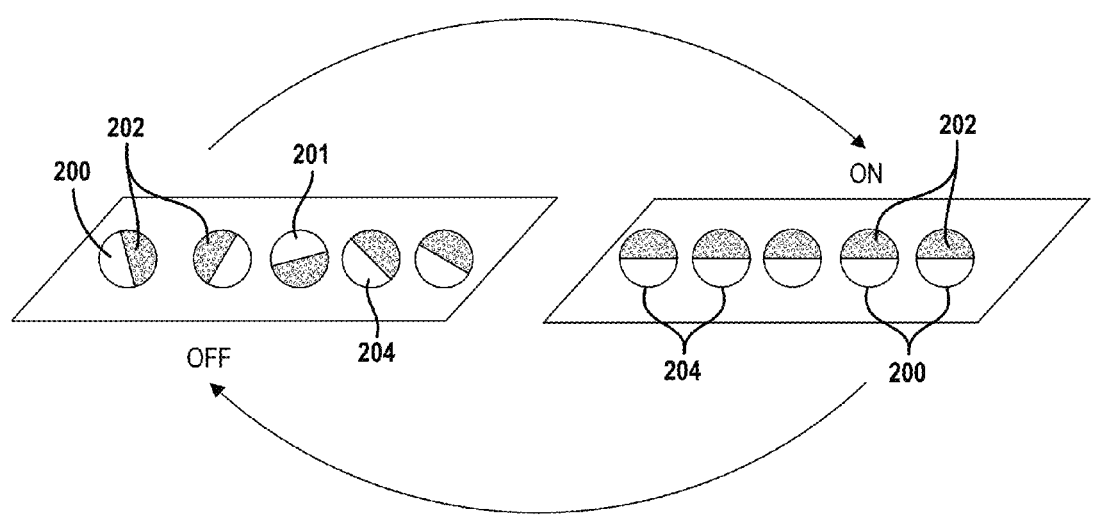
Figure 8A:
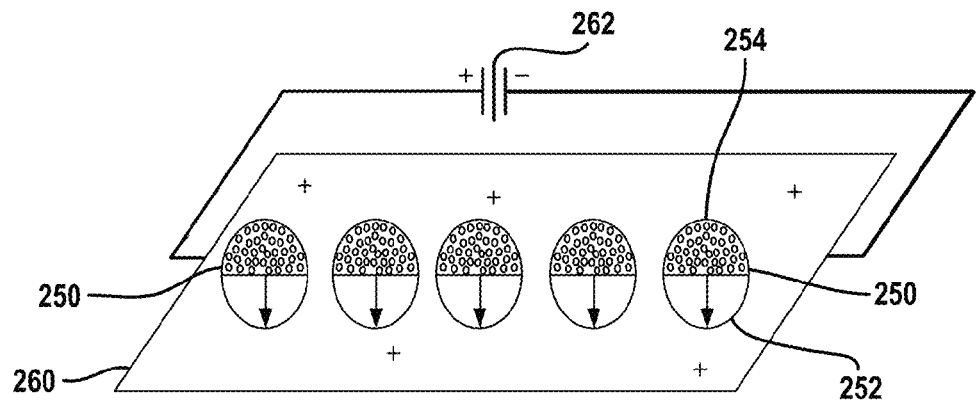
Figure 8B:
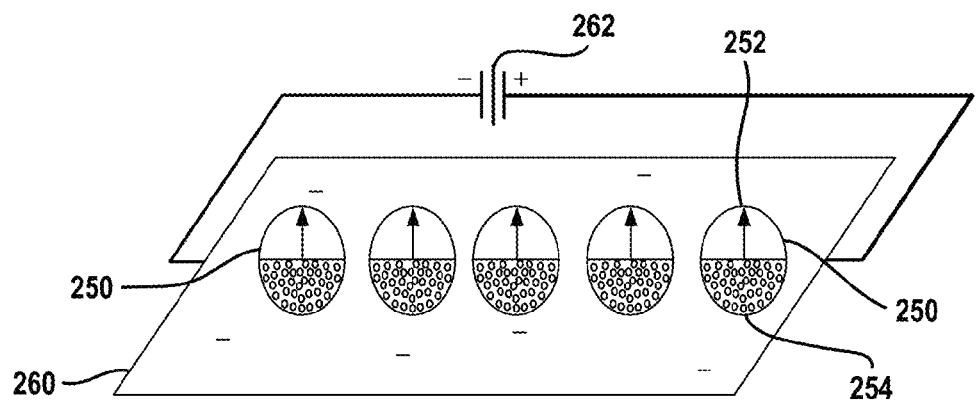

FIG. 4 shows an exemplary block magnet configuration magnetized through the thickness, where colors are used to indicate three different areas among six sides; red-colored area(s) represents magnetic poles, grey-colored region(s) is thickness (>2 inches)×width, and white-colored side(s) is thickness (>2 inches)×length (>1 inch), where the width is a shortest length (<1 inch). These dimensions are merely exemplary. For most advantageous operation, preferably a non-pole side, like the white side of the magnet is used. The grey regions may also be used if the width is longer than the length (>1 inch). In preferred aspects, the red areas (magnet poles) are not used regardless of their size;

FIGS. 5A-5B: (5A) In this embodiment, the white area (non-pole side) of a magnet as in FIG. 4 is located at the top of an optical device. After removing the magnet from the region proximate to the top of the device, a "black" color in a feature of the optical device appears. (5B) Shows the spreading of the particles evenly on the top surface in regions defining optic features in the optical device, achieved by approaching any edge part of magnet near an empty region of the surface in an optic feature;

FIG. 6 shows locating an exemplary optical device prepared in accordance with certain aspects of the present disclosure onto a white-colored non-pole area of a magnet to switch the particles to a "yellow" color. If necessary, the exemplary optical device can be swung on or above a magnet;

FIG. 7 is a schematic illustrating the functioning of a display based on biphasic monolayers;

FIGS. 8A-8B show an electronic display device using multiphasic colorant particles in accordance with certain principles of the present teachings having a dipole moment (shown by the arrow) where an EMF source is applied so that the particles have a first orientation in (8A) and a second opposite orientation in (8B);

FIGS. 9A-9F: (9A) Schematic process of electrohydrodynamic co-jetting and microsectioning used to prepare bicompartmentalized magnetic microcylinders with different aspect ratios. (9B) Micrograph overlaying FITC (green) and TRITC (red) fluorescence emission ranges obtained from confocal laser scanning microscopy (CLSM) representing cross-sectional view of bicompartmentalized microfiber bundle (PLGA polymer) having a green fluorophore, and red fluorophore with magnetite in the red compartment (Methods); and micrograph of transmission electron microscopy (TEM) in inset showing the compartmentalization of the magnetite. (9C) CLSM image of microcylinders (l=50 and d=20 μm) and optical microscopy (OM) image in inset. (9D) OM image of microdisks (l=10 and d=20 μm) and CLSM micrograph overlaying the FITC and transmission channel in inset. (9E) Photograph of water suspension of microcylinder (TiO$_2$ and CB/magnetite respectively in each compartment; l=500 and d=250 μm) with a red background (paper), and corresponding microfiber in inset. (9F) Photograph of water suspension of microcylinder (Yellow 14 and CB/magnetite respectively in each compartment; l=500 and d=250 μm), and its microfiber in inset. Scale bars are 50 μm at (9B)-(9D) and 200 μm (9E)-(9F).

FIGS. 10A-10G: (10A) Scheme showing that the longest axis (I) of the compartmentalized microcylinders is aligned in the direction of the magnetic field gradient. (10B) CLSM micrograph of the microcylinders. (10C, 10D) Scheme and CLSM image of anisotropic magnetic microcylinders that are standing up on a surface under a z-directional magnetic field. (10E) Surface tumbling of the microcylinders under the influence of a rotating magnetic field. (10F) CLSM images showing the tumbling motion of microcylinders (l=40 and d=13.5 μm) with an angular frequency (ω=~0.1 sec$^{-1}$) and translational displacement (L). (10G) Time sequential CLSM images indicating that a mixture of magnetic microcylinders (l=50 and d=20 μm)/microdisks (l=10 and d=20 μm) separate according to their aspect ratios when presented with a microbarrier (PLGA fiber, d=20 μm). All scale bars are 50 μm and a 5 mT magnetic field is applied.

FIGS. 11A-11F: (11A) Scheme for assembly of magnetic microcylinders to from staggered chains under the influence of a parallel magnetic field x-direction). (11B) OM image of the microcylinders at a higher concentration under the influence of the x-directional magnetic field. (11C) CLSM micrograph of the microcylinders with parallel magnet configuration forming staggered chains. (11D) OM image of the microcylinders under the influence of a z-directional magnetic field. (11E) Photograph of assembled microcylinders with yellow/black colors (FIG. 9F) in the direction of the magnetic field gradient. (11F) Photograph of the microcylinders after orthogonally rotating the magnet. Scale bars are 50 um at (11B)-(11D), and 1.5 mm at (11E) and (11F), and a 20 mT magnetic field is applied.

FIGS. 12A-12F: (12A) Scheme of the color switching of the bicompartmentalized magnetic microcylinders, which is controlled by approaching a magnet from the z-direction; $S_1$ indicates a random state of the particles in the absence of the magnet, $S_2$ denotes a state, where the longest axis of the microcylinders is aligned in the direction of the magnetic field gradient, and the $S_3$-state signifies that the magnetic compartment are facing in the direction of the magnetic field gradient after magnetophoresis. (12B) Top view of black/white colored microcylinders (FIG. 9E). (12C) Surface switching to reveal black color. (12D) Photographs of yellow/black pigmented microcylinders (FIG. 9F). (12E) Top view of the device after surface switching. (12F) Top view of the device after the magnet is placed below the device. (12G) Examples of magnetophoretic surfaces switches. Scale bars are all 2 mm at (12D) to (12F), and 50-300 mT magnetic fields are applied.

Figure 9C:
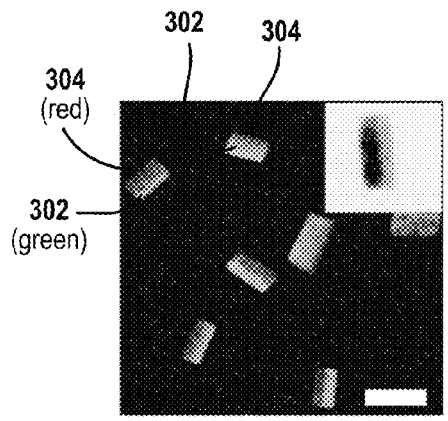
Figure 13:
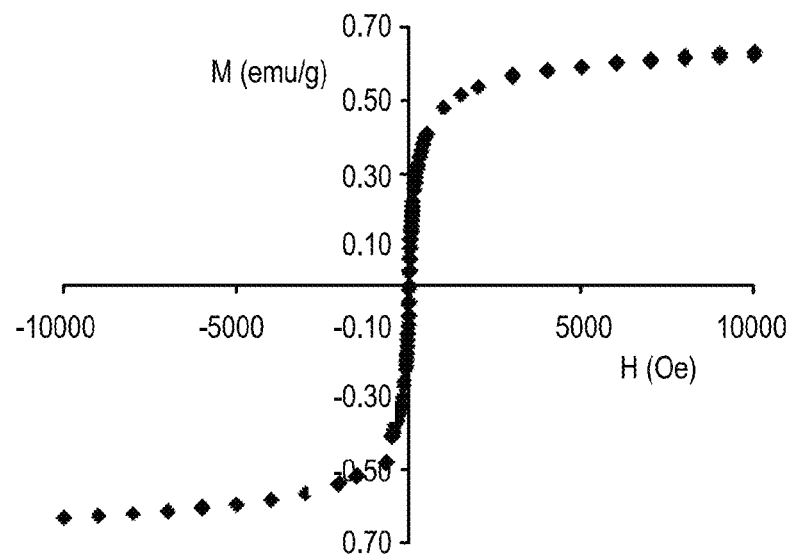
Figure 14:
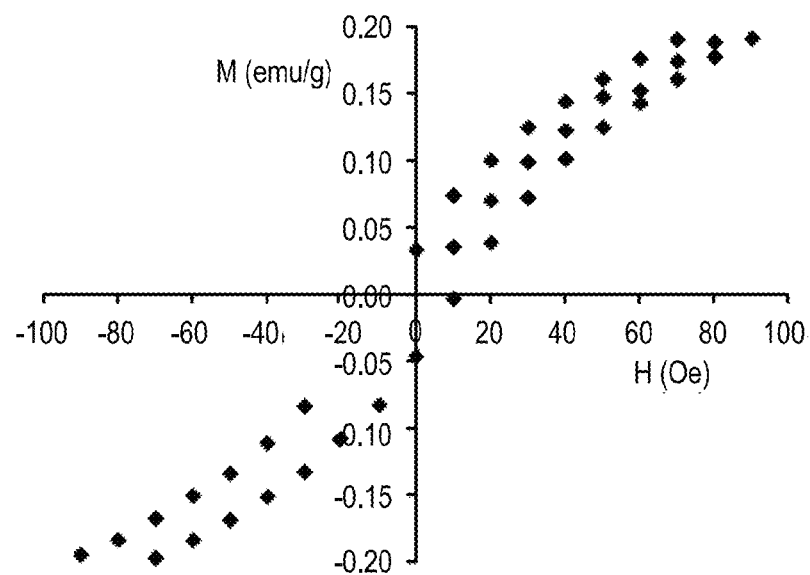
Figure 15:
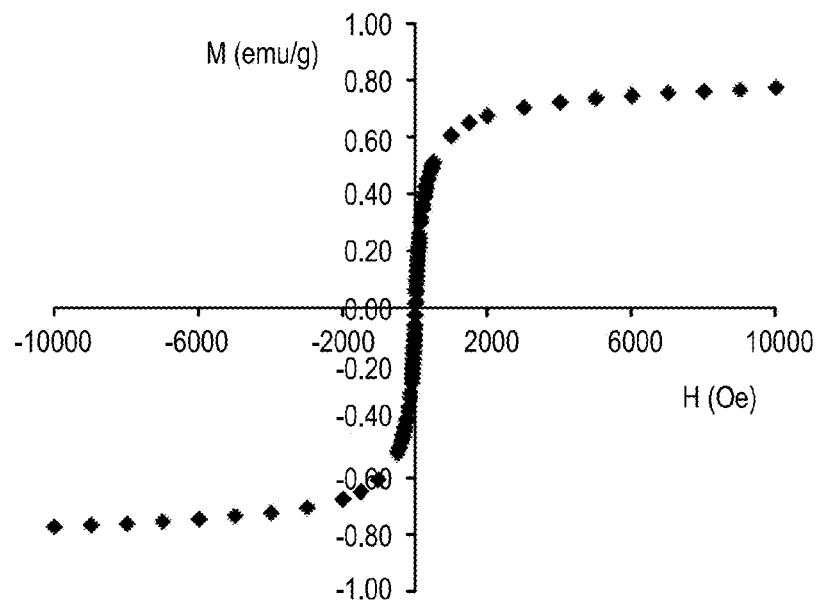
Figure 16:
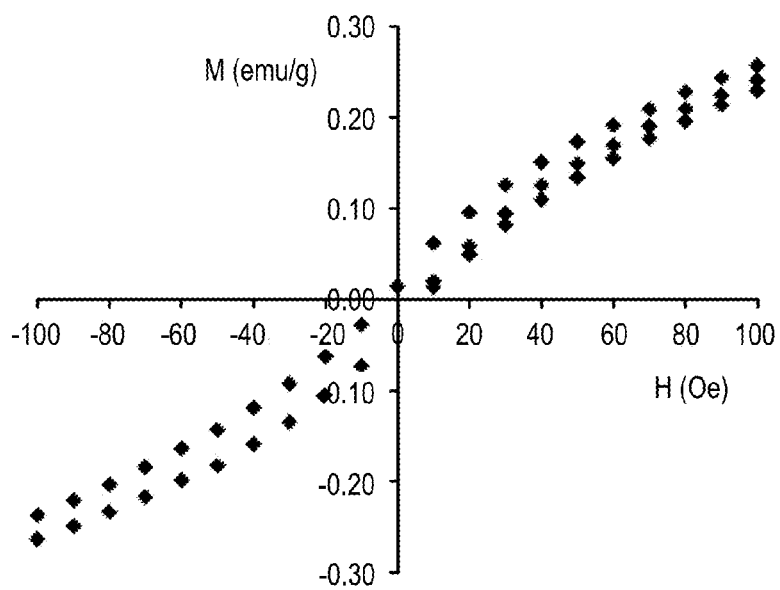

FIG. 13 shows M-H Hysteresis of bi-compartmentalized magnetic microcylinders determined by a SQUID magnetometer (Quantum Design) at rt corresponding to the particles (l=50 and d=20 μm) shown in FIG. 9C;

FIG. 14 is an enlarged graph of FIG. 13 showing that the residual induction ($B_r$) is 0.03 emu/g;

FIG. 15 shows M-H Hysteresis of bi-compartmentalized magnetic microcylinders determined by a SQUID magnetometer (Quantum Design) at rt corresponding to the particles (l=500 and d=250 μm) shown in FIG. 9F;

FIG. 16 is an enlarged graph of FIG. 15 exhibiting that $B_r$ is 0.01 emu/g;

FIGS. 17A-17B: (17A) A rotating magnetic field along with a perpendicular axis (z axis) is shown showing that an exemplary microcylinder prepared in accordance with certain aspects of the present teachings revolves opposite to a direction of magnetic field. (17B) Time sequential confocal laser scanning microscopy (CLSM) images (superimposed with transmission and fluorescein isothiocyanate (FITC) emission) showing that the microcylinder spins clockwise by the rotating field anticlockwise along with the z axis.

FIG. 18: Magnetic mobility of the microcylinders prepared in accordance with certain aspects of the present teachings (yellow/black pigmented particles) in a display is experimentally measured from velocity ($\mu_m$) and gradient magnetic field ($\nabla B^2/2\mu_0$).

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various phases, elements, components, regions, layers and/or sections, these phases, elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first phase, element, component, region, layer or section discussed below could be termed a second element, component, region, layer or section without departing from the teachings of the example embodiments.

Spatially relative terms, such as "top", "bottom," "side," "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Throughout this disclosure, the numerical values represent approximate measures or limits to ranges to encompass minor deviations from the given values and embodiments having about the value mentioned as well as those having exactly the value mentioned. Other than in the working examples provides at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range, including endpoints given for the ranges.

Example embodiments will now be described more fully with reference to the accompanying drawings. The present disclosure pertains to optical devices and displays. An optical device may be used in a variety of applications, such as visual, optical, and/or electronic displays, including in electronic paper, display devices, panels, screens, monitors, sensors, and the like, by way of non-limiting example. The optical devices of the present disclosure employ a plurality of multiphasic particles, where each multiphasic particle has optically distinct phases. The plurality of multiphasic particles is disposed in one or more regions of a display component of the optical device. The optical device defines optic features that can be externally observed, such as a character or pixel, by way of non-limiting example. Desirable multiphasic particles comprise a first phase and at least one additional phase distinct from the first phase, wherein the first phase comprises a first colorant and the one or more additional phases comprise a second colorant distinct from the first colorant. In certain embodiments, the multiphasic particles may comprise one or more additional phases, for example, a third phase having a third colorant distinct from the first and second colorants. Further, the present disclosure contemplates one or more distinct multiphasic particles in the plurality of particles. In such embodiments, the plurality of multiphasic particles includes a first multiphasic particle (having the first phase and one or more additional phases), as well further comprising at least one additional distinct multiphasic particle, having a third phase and one or more additional phases.

Further, at least one of the first phase and the at least one additional phase comprises a material receptive to a force field. In embodiments where multiple distinct multiphasic particles constitute the plurality of particles, at least one phase of each type of particle has a material that is receptive to the force field. In certain aspects, "receptive" means that the material has a physical response when in the presence of an external force field, for example, changing position, shape, or other discernable characteristics. Examples of force fields include magnetic fields, electric fields, pressure, sonication, light, and the like. In certain variations of the present disclosure, magnetic force fields are preferred. Therefore, in certain embodiments, the optical device may further include a magnet that generates the force field transmitted to the display component. In such embodiments, the material receptive to the force field contained in at least one phase of the multiphasic particle can be a magnetic material, for example. Thus, in the presence of the force field, whether magnetic or otherwise, the display component reversibly exhibits a first optical state, which may correspond to a first color for example. Furthermore, the absence of the force field or a modification to the force field can modify the orientation of particles to exhibit a second distinct optical state that differs from the first optical state, like a second distinct color, for example.

In various aspects, the multiphasic particles have visually distinct phases and are anisotropic, therefore such multiphasic particles are capable of being oriented with regard to the region being exhibited (e.g., in a region corresponding to an optic feature). Thus, the particles can be oriented to create an optic feature that can exhibit a first optical state in the presence of an external force field, where the particles are oriented in a first direction. When the external force field is altered (for example, with respect to quantity or gradient, polarity, or being switched on or off), at least a portion of the plurality of particles are oriented in a second distinct direction so that the force field induces a second optical state that is optically distinct from the first optical state. By way of non-limiting example, the first optical state may correspond to a first color and the second optical state may correspond to a second color.

In certain variations, the display component comprises a first side and a second side opposite to the first side. One or more magnets may be disposed adjacent to a first side of the display component to induce the first optical state. If such magnet(s) are disposed adjacent to a second side of the display component it will induce a second optical state distinct from the first optical state. In certain variations, the magnet(s) may be moved relative to the display component or alternately the display component may be moved relative to the magnet(s).

In other variations, the present disclosure provides methods of reversibly switching particle orientation for an optic display, by using such optical devices. Such a method may optionally include transmitting a magnetic force field to a display component that comprises a plurality of multiphasic particles. Notably, the plurality of multiphasic particles encompasses the use of one type of multiphasic particle, but may also include one or more distinct multiphasic particles, as discussed above. The multiphasic particle comprises a first phase and at least one additional phase distinct from the first phase. The first phase comprises a first colorant and the one or more additional phases comprise a second colorant distinct from the first colorant, thus forming a multiphasic particle having optically distinct phases. Further, as discussed above, in certain embodiments, the multiphasic particles may comprise one or more additional phases, for example, a third phase having a third colorant distinct from the first and second colorants. At least one phase (either the first phase and the at least one additional phase) comprises a magnetic material receptive to the magnetic force field, wherein during or after the transmitting of the magnetic force field the display component reversibly exhibits a first optical state. The method may include generating the external force field and transmitting it to the display component. For example, an external magnet can be used to generate the magnetic force field transmitted to the display component.

The display component comprises a first side and a second side opposite to the first side. The force field generator, like a magnet, is placed adjacent to a first side of the display component to induce the first optical state. The force field generator can then be placed adjacent to the second side of the display component to induce a second optical state distinct from the first optical state. The force field generator can then be placed adjacent to the first side and repeated, as needed, because the first and second optical states are reversible conditions, depending on the orientation of the magnetic field and the magnetophoretic effects on the display component. It should also be noted that the present disclosure is not limited to only first and second optical states, but may include a multitude of distinct optical states that are achieved by altering the orientation of the particles (where the particles may have three or more optically distinct phases and/or by using a mixture of distinct multiphasic particles in a single optic feature) by controlling the quantity, direction, and/or gradient of the force field applied. Notably, multiphasic particles may be used that are responsive to distinct force fields, for example, one particle may be responsive to a magnetic field, where a distinct particle may be responsive to electric charge, for example.

In various aspects, multiphasic colorant micro-components and nano-components particularly suitable for use as multiphasic particles in optical devices of the present disclosure are described as being formed in Lahann et al, entitled "Multiphasic Nano-Components Comprising Colorants" in U.S. Pat. No. 7,947,772 (U.S. application Ser. No. 12/137,121)" which is commonly assigned to the assignee of the present application. The content of U.S. Patent Publication No. 2008/0242774 is incorporated herein by reference in its entirety. In certain aspects, one or more phases of the multiphasic particles optionally include a component responsive to a controllable external force field, making the multiphasic particle having colorants suitable for use as a pixel for an optic display, for example. In yet other aspects, a multiphasic particle optionally includes a component or have one or more exposed phase surfaces that enable relative orientation and self-assembly of the particles on a surface or substrate.

Anisotropic multiphasic particles possessing two or more distinct phases, at least one of which comprises a colorant; therefore having two or more optically distinct phases, are desirable for use in a variety of applications for micro/nanotechnology. In various aspects, multiphasic components suitable for use with the present technology, such as biphasic micro-particles, comprise one or more colorants. Such multiphasic colorants (MPCs) can be made in a process that uses electrified jetting techniques to fabricate polymer-based. In certain aspects, such multiphasic colorants are nano-component particles. In other aspects, the multiphasic colorants are micro-component particles.

A "nano-component" is a material that has a variety of shapes or morphologies, however, generally has at least one spatial dimension that is less than about 10 μm (i.e., 10,000 nm). The term "nano-sized" or "nanometer-sized" is generally understood by those of skill in the art to mean less than about 10 μm (i.e., 10,000 nm), optionally less than about 2 μm (i.e., less than about 2,000 nm), optionally less than about 0.5 μm (i.e., 500 nm), and in certain aspects, less than about 200 nm. In certain aspects, a nano-component as used herein has at least one spatial dimension that is greater than about 1 nm and less than about 10,000 nm. In certain aspects, a nano-component has at least one spatial dimension of about 5 to about 5,000 nm. In some aspects, at least one spatial dimension of the nano-component is about 20 to about 2,000 nm. In still other variations, nano-components have at least one spatial dimension of about 50 to about 500 nm.

A "micro-component" is a material that has a variety of shapes or morphologies, however, generally has at least one spatial dimension that is less than about 1,000 μm (1 mm), optionally less than 500 μm, optionally less than 250 μm, optionally less than 100 μm, optionally less than about 75 μm, optionally less than about 50 μm, optionally less than about 25 μm, optionally less than about 20 μm, optionally less than about 10 μm (i.e., 10,000 nm), optionally less than or equal to about 5 μm (i.e., 5,000 nm) and in certain aspects, optionally less than about 1 μm (i.e., 1,000 nm). Of course, as appreciated by those of skill in the art, other dimensions of the particle may be significantly greater than the dimension falling within the nano or micro range.

As mentioned above, the micro-components (used interchangeably with the term "nano-objects," "nano-components," and "micro-objects") may have a variety of geometries or morphologies, including, by way of non-limiting example, spheres, rectangles, polygons, disks, ellipsoids, toroids, cones, pyramids, rods/cylinders, beads-on-a-string, fibers, and the like. Micro-fibers generally have an elongated axial dimension that is substantially longer than the other dimensions of the micro-fiber. A "micro-particle" generally refers to a micro-component where all three spatial dimensions are micro-sized and less than or equal to about 1 mm (e.g., less than about 1,000 μm). Again, in certain variations, nano-particles have at least one spatial dimension of about less than about 5,000 nm (about 5 μm). Micro-spheres and nano-spheres are substantially spherical. Micro-rods and nano-rods are components that are substantially cylindrical or rod-shaped.

In certain aspects, the multiphasic particles comprise materials in a solid phase or a semi-solid phase, although liquid phases are contemplated in certain variations. The term "structural component" as used herein means a compound of the multiphasic particle that renders it solid. In certain aspects, at least one phase of the multiphasic particle comprises at least one colorant. As appreciated by one of skill in the art, the first phase and the second phase (or additional distinct phases) can optionally include other colorants that are the same or different from one another. Thus, in certain aspects, the multiphasic component comprises a first phase having a first colorant and a second distinct phase having a second colorant. For example, where a multiphasic composition comprises a first phase and a second distinct phase, the first phase comprises the first colorant (or a plurality of colorants) and the second phase likewise optionally comprises the second colorant (or plurality of colorants). When present, one or more of the first colorants in the first phase are optionally distinct from the one or more second colorants present in the second phase. Stated in another way, the first phase may comprise at least one distinct colorant from the second phase. Multiple phases of the composition may each respectively comprise a plurality of distinct colorants. In other aspects, one or more of the distinct phases of the multiphasic particle may have a common colorant. The first and second phases (or additional phases) may contain one or more of the same colorants or different colorant mixtures. In certain aspects, the multiphasic particles comprise multiple colorants.

Thus, in various aspects, the multiphasic components suitable for use in the optical devices of the present teachings include a first phase and at least one additional phase that is distinct from the first phase. In certain preferred embodiments, the multiphasic particles are anisotropic. In certain aspects, the multiphasic components include multiple distinct phases, for example three or more distinct phases. As used herein, "multiphase" or "multiphasic" means that at least two phases herein occupy separate but distinct physical spaces to form the particle shape defining distinct "compartments." In certain embodiments, such phases are in direct contact with one another (e.g., they are not separated by a barrier and they are not emulsified or mixed to any significant degree). By the term "phase" it is meant that a portion, domain, or region of a component is chemically and/or physically distinct from another portion, domain, or region of the component, for example a phase may have one average composition distinct from another phase having a different average composition. Each respective phase optionally occupies a spatially discrete region or compartment of the particle. In certain aspects, each respective phase of the multiphasic component is exposed to an external environment, thus providing exposure of the respective phase surfaces of the multiphasic component to an external environment. The exposure of each respective surface of each phase provides enhanced environmental interface and optimum visibility for optical applications.

In certain aspects, the respective phases are visible to the human eye and/or to an electronic or automated sensor. In other aspects, a plurality of similar multiphasic colorant particles may generate a net visual effect when similar phases are grouped together to exhibit a color field (so that the individual multiphasic colorant particles phases may not necessarily be discernable to the human eye). Such a particle comprises at least one colorant and at least two distinct phases, such that the respective phases occupy distinct regions or domains in the component, which are visually, optically, and/or physically distinct from one another. By way of example, two similar phases may include a first polymer phase comprising a colorant (e.g., pigments, dyes, particles) and a second polymer phase comprising the same colorant at a different concentration to result in a region or domain having a different average composition, which provides a visually distinct effect. Alternately, the two phases may vary in composition and/or colorants and thus may include multiple visually or optically distinct phases.

In yet other aspects, the present disclosure employs a multiphasic particle comprising a first phase and at least one additional phase distinct from the first phase, where at least one of the first phase and the additional phase comprises a polymer or polymer precursor. A first colorant present in the first phase and a second colorant present in the second phase are optionally independently selected from the group of materials consisting of: low-molecular weight dye, a laser dye, a textile dye, a paint dye, a paint pigment, a coating dye, a coating pigment, a plastic colorant, a metal colorant, a ceramic colorant, a fluorescent dye, a phosphorescent dye, a natural dye, a polymeric dye, inorganic pigment, an organic pigment, and combinations thereof. In certain variations, a first colorant present in the first phase and a second colorant present in the second phase are optionally selected from materials including a pearlescent pigment, a metallic flake pigment, a cholesteric liquid crystal (CLC) pigment, an ultramarine pigment, a fluorescent pigment, a phosphorescent pigment, an inorganic pigment, a carbon black pigment, a natural pigment, an organic pigment, a mixed metal oxide pigment, an iron oxide pigment, a titanium dioxide pigment, a metal colorant, a ceramic colorant, a plastic colorant, an organic azo pigment, an organic polycyclic pigment, a dyeing lake pigment, an azine pigment, a direct dye, a vat dye, a sulfur dye, a reactive dye, a disperse dye, an acid dye, an azoic dye, a synthetic dye, a basic dye, a laser dye, a polymeric dye, a natural dye, a fluorescent dye, and/or a phosphorescent dye. The first phase and the at least one additional phase each have an exposed surface and form a multiphasic particle having optically distinct exposed surfaces.

In each variation, a number of morphologies are possible for the multiphasic particles comprising a colorant. The shapes of multiphasic colorant particles formed in accordance with the present teachings include: spheres, rectangles, polygons, disks, ellipsoids, toroids, cones, pyramids, rods, cylinders, beads-on-a-string, and fibers. The particles phases in certain variations optionally have parallel alignment. In yet another embodiment of the present disclosure, the particles comprises multiple phases distributed within one another (continuous/discontinuous phases).

Thus, in various aspects, the present disclosure provides multiphasic particles that have a plurality of physically and/or compositionally distinct phases, such as taught by U.S. Pat. No. 7,947,772 (U.S. application Ser. No. 12/137, 121), which was previously incorporated by reference in its entirety. In addition to the teachings of U.S. Pat. No. 7,947,772, which provides multiphasic particles that can be formed by electrified jetting of materials that comprise one or more polymers, such techniques are also disclosed in Roh et al. in "Biphasic Janus Particles With Nanoscale Anisotropy", Nature Materials, Vol. 4, pp. 759-763 (October, 2005), as well as in U.S. Publication No. 2006/0201390 and in PCT Publication No. WO 06/137936, both of which are entitled "Multi-phasic Nanoparticles" to Lahann et al. and in U.S. Provisional Patent Application Nos. 60/626,792 filed on Nov. 10, 2004 and 60/651,288 filed on Feb. 9, 2005, all of which are to Lahann and assigned to a common assignee as the present disclosure. The contents of each of these respective references are hereby incorporated by reference in their respective entireties. U.S. Patent Publication No. 2008/0242774 also teaches methods of making such multiphasic particles to control the particle morphology and number of respective phases. Thus, electrified jetting methods to form such multiphasic particles will only be discussed briefly herein.

The multiphasic particles can be made by a process involving electrified jetting used to create such anisotropic multiphasic particles. In suitable electrified jetting techniques, liquid jets having a nanometer- or micro-sized diameter are shaped using electro-hydrodynamic forces. When a pendant droplet of conductive liquid is exposed to an electric potential, for example, of a few kilovolts, the force balance between electric field and surface tension causes the meniscus of the pendent droplet to develop a conical shape, the so-called "Taylor cone." Above a critical point, a highly charged liquid jet is ejected from the apex of the cone, thus forming a particle, such as a particle or fiber. Such electrical jetting techniques can be used in accordance with the present teachings to fabricate anisotropic microparticles or nanoparticles that can be useful for color or optical applications, where the special properties of the resulting colorant particles (amphiphilic, controlled pigment shapes, nano-scale design) lead to their usefulness in optical and electronic displays, for example.

Multiphasic particles can be made of a wide variety of materials, including inorganic and organic materials. In various embodiments, at least one phase of the multiphasic colorant particles comprises at least one polymer, copolymer, or polymer precursor (e.g., monomer(s)), referred to herein generally as a "polymer." In certain aspects, multiple phases of the multiphasic colorant particles each comprise one or more polymers. In various aspects, the particles are formed by jetting liquid streams comprising a material optionally selected from liquid solutions, curable polymer precursors or monomers, polymer solutions, and polymer melts. Thus, each respective phase of the final particle product is formed from a material originating in the respective liquid streams. Specifically, each phase optionally contains polymers or polymer precursors (which upon curing form polymers), such as biodegradable or non-biodegradable polymers, biocompatible polymers, or natural polymers can be used. The particles can be further treated, for example by subsequent cross-linking induced by heat or actinic radiation (e.g., photochemically induced). Moreover, the cross-linking may also immobilize active materials, such as colorants, in the final product.

Thus, in certain aspects, the polymers can also be modified by chemical or physical methods after formation via electrified jetting, such as by cross-linking, heat treatment, photochemical treatment, and/or changes in the chemical or physical environment. The polymer modification can optionally occur in a select portion or region of one or more of the multiple phases, or such polymer modification can occur to different degrees, potentially resulting in different materials or materials responses, as appreciated by one of skill in the art. Such polymer modification and/or treatment provides the ability to control release kinetics of respective phases, when desired.

Specifically, polymers, such as biodegradable or non-biodegradable polymers, biocompatible polymers, or natural polymers can be used. In one aspect, the first phase of the multiphasic particle comprises a first polymer and the second phase comprises a second polymer that is distinct from the first polymer. Thus, in certain aspects different polymers can be used in at least two phases of the multiphasic particle composition. In certain respects, different polymers used in the different phases of the MPC permit different active ingredient release kinetics, which can be useful in designing release of the active ingredient into the environment.

In certain aspects, the phases of the MPC dissolve or disintegrate at different rates. In this regard, the dissolution rate of the respective phases impacts the release rate of the active ingredient from each phase, thus providing control over the release kinetics and concentration of active ingredient to be delivered to target regions with each respective phase of the particle. As referred to herein, "dissolve" refers to physical disintegration, erosion, disruption and/or dissolution of a material. The phases may dissolve or disintegrate at different rates or have different solubilities (e.g., aqueous solubility) that impact the rate of colorant or active ingredient release. Each phase comprises one or more materials that dissolve or erode upon exposure to a solvent comprising a high concentration of water or other solvents. In some variations, a phase may disintegrate into small pieces or may disintegrate to collectively form a colloid or gel. In some aspects, a phase of the MPC comprises a polymer that is insoluble or has limited solubility in water, but is dispersible in water, so that the polymer breaks down or erodes into small fragments. In other aspects, a polymer used in a phase of the MPC is insoluble in water, but swellable. In variations where a polymer does not fully break down during use, the polymer can be a water-repellant polymer or an aqueous-stable hydrophilic polymer, for example, certain types of cellulose. In various aspects, each phase of the MPC optionally comprises a combination of polymer materials.

Suitable non-limiting polymers for use in the multiphasic compositions include sodium polystyrene sulfonate (PSS), polyethers, such as a polyethylene oxide (PEO), polyoxyethylene glycol or polyethylene glycol (PEG), polyethylene imine (PEI), a biodegradable polymer such as a polylactic acid, polycaprolactone, polyglycolic acid, poly(lactide-co-glycolide) polymer (PLGA), and copolymers, derivatives, and mixtures thereof. Other polymers include well known to those of skill in the art to be used in pharmaceutical, oral care, and personal care compositions, such as polyvinylpyrrolidone. Other polymers include those known in the art for use in paint compositions, ink compositions (including ink jet compositions), electronic ink compositions, and the like, including curable monomers or polymer precursors. Specifically, at least one phase can be designed to have one or more of the following properties based upon material selection: hydrophobic, positively-charged (cationic), negatively-charged (anionic), polyethylene glycol (PEG)-ylated, covered with a zwitterion, hydrophobic, superhydrophobic (for example having with water contact angles in excess of 150°), hydrophilic, superhydrophilic (for example, where the water contact angle is near or at 0°), olephobic/lipophobic, olephilic/lipophilic, and/or nanostructured, among others. In other aspects, one or more polymers or materials used within a phase may be functionalized to subsequently undergo reaction with various moieties or substances after formation of the multiphasic particle, to provide desired surface properties or to contain various moieties presented on the phase surface, as recognized by those of skill in the art.

Water-soluble and/or hydrophilic polymers, which are cosmetically and pharmaceutically acceptable, include cellulose ether polymers, including those selected from the group consisting of hydroxyl alkyl cellulose, including hydroxypropyl methyl cellulose (HPMC), hydroxypropyl cellulose (HPC), hydroxyethyl cellulose (HEC), methyl cellulose (MC), carboxymethyl cellulose (CMC), and mixtures thereof. Other polymers among those useful herein include polyvinylpyrrolidone, vinyl acetate, polyvinylpyrrolidone-vinyl acetate copolymers, polyvinyl alcohol (PVA), acrylates and polyacrylic acid (PAA), including polyacrylate polymer, vinylcaprolactam/sodium acrylate polymers, methacrylates, poly(acryl amide-co-acrylic acid) (PAAm-co-AA), vinyl acetate and crotonic acid copolymers, polyacrylamide, polyethylene phosphonate, polybutene phosphonate, polystyrene, polyvinylphosphonates, polyalkylenes, and carboxy vinyl polymer. The multiphasic particle compositions may comprise derivatives, copolymers, and further combinations of such polymers, as well.

Other polymers or water-soluble fillers among those useful herein include, without limitation, sodium alginate, carrageenan, xanthan gum, gum acacia, Arabic gum, guar gum, pullulan, agar, chitin, chitosan, pectin, karaya gum, locust bean gum, various polysaccharides; starches such as maltodextrin, amylose, corn starch, potato starch, rice starch, tapioca starch, pea starch, sweet potato starch, barley starch, wheat starch, modified starch (e.g., hydroxypropylated high amylose starch), dextrin, levan, elsinan and gluten; and proteins such as collagen, whey protein isolate, casein, milk protein, soy protein, keratin, and gelatin.

Further, non-limiting examples of water insoluble or hydrophobic polymers include cellulose acetate, cellulose nitrate, ethylene-vinyl acetate copolymers, vinyl acetate homopolymer, ethyl cellulose, butyl cellulose, isopropyl cellulose, shellac, hydrophobic silicone polymer (e.g., dimethylsilicone), polymethyl methacrylate (PMMA), cellulose acetate phthalate and natural or synthetic rubber; siloxanes, such as polydimethylsiloxane (PMDS), polymers insoluble in organic solvents, such as cellulose, polyethylene, polypropylene, polyesters, polyurethane and nylon, including copolymers, derivatives, and combinations thereof. The polymers may be crosslinked after formation by application of heat, actinic radiation or other methods of curing and treating polymers known to those of skill in the art.

In various aspects of the present disclosure, the polymers (or polymer precursors) are present in a liquid phase prior to electrified jetting or spraying at about 0.1 to about 100% by weight (on a wet basis); optionally about 1 to about 90 wt. %; optionally about 3 to about 75 wt. % of the jetting stream. While the relative concentrations of polymers in a phase can vary greatly depending on the polymer, application, and process parameters used for forming the particle, in certain aspects, the polymer is optionally present at about 2% to about 50% by weight; optionally from about 3% to 15% by weight of the respective phase.

The structural components and the colorants typically form a single phase (exclusive of solvents, vehicles, and/or carriers) after the jetting process. The components are selected such that in certain aspects the components are thermodynamically compatible or alternately are thermodynamically incompatible with one another, depending on the desired properties of the MPC being formed. In the jetting process accompanying solvent evaporation and size reduction, even incompatible components can form a single phase by kinetic entrapment.

In yet another embodiment of the disclosure, multiphasic particles with selective chemical modification are provided. The particles are formed from one or more liquid streams that include one or more reactive components that react with a structural component (i.e., a polymer) thereby rendering a resulting surface of the multiphasic particles chemically modified as compared to the surface when the one or more reactive components are absent. For example, during the formation of multiphasic particles, reactive functional groups are optionally incorporated by adding appropriate components in each respective jetting solution. After jetting, the surface of the particle will have different functional groups at each respective phase surface corresponding to the materials present in each respective jetting solution. In some variations, the different phases are detected by optical or electronic sensors, or by fluorescent or electron microscopy, for example.

In one aspect, the first phase of the multiphasic particle comprises a first polymer and the second phase comprises a second polymer that is distinct from the first polymer. Thus, in certain aspects different polymers can be used in at least two phases of the multiphasic particle composition. In certain respects, different polymers used in the different phases of the MPC permit different surface properties or colorant or active ingredient release kinetics, which can be useful in designing release of the active ingredient into the environment. Further, otherwise incompatible ingredients, such as colorants or other ingredients can be stored simultaneously under stable conditions in near proximity to one another. In addition to colorants, respective phases may contain one or more active ingredients, which may otherwise be incompatible with other active ingredients. Thus, in certain embodiments, the first phase comprises materials compatible with the first colorant component and the second phase similarly has materials compatible with the second colorant component. Thus, a lipophilic, hydrophobic, or charged colorant (e.g., cationic or anionic) or active ingredient can be included in one phase of the MPC and a hydrophilic or oppositely charged colorant or active ingredient can be included in a second phase; however both the first and second colorants/active ingredients are stored in close proximity to one another and can be delivered simultaneously to a target substrate.

In various aspects, at least one of the phases comprises a material that is receptive to an external energy source (for example, a force field that is controllable, such as magnetic fields, electric fields, heat or electromagnetic energy, pressure, sonication, and the like). In certain preferred aspects, such a material that is receptive with an external force field is a magnetic material that is receptive to a magnetic field. Suitable magnetic materials that are receptive to a magnetic force field include, by way of non-limiting example, $Fe_2O_3$, (e.g., $\gamma\text{-}Fe_2O_3$), $Fe_3O_4$ (e.g., magnetite and $Fe_3O_4$ nanocrystals), $MnFe_2O_4$, $CoFe_2O_4$, $NiFe_2O_4$, Ni—Fe alloys, and combinations, variations, and equivalents thereof.

The amount of magnetic materials included in one or more phases of the MPCs will depend on the selection of the magnet, size of the optical device and optic feature, and the like. In certain aspects, the magnetic particle may also be the colorant for a given phase. In certain aspects, the magnetic particle is present in the respective phase at optionally less than or equal to about 95 wt. %; optionally less than or equal to about 85 wt. %; optionally less than or equal to about 75 wt. %; optionally less than or equal to about 65 wt. %; optionally less than or equal to about 55 wt. %; optionally less than or equal to about 50 wt. %; less than or equal to about 45 wt. %; optionally less than or equal to about 40 wt. %; optionally less than or equal to about 35 wt. %; optionally less than or equal to about 30 wt. %; optionally less than or equal to about 25 wt. %; optionally less than or equal to about 20 wt. %; optionally less than or equal to about 15 wt. %; optionally less than or equal to about 10 wt. %; optionally less than or equal to about 5 wt. %; optionally less than or equal to about 3 wt. %; optionally less than or equal to about 1 wt. %; and in certain aspects less than or equal to about 0.5 wt. %. In certain aspects, each respective phase in the particle comprises about 0.1 to about 95% by weight of magnetic material of the total phase composition; optionally about 0.5 to about 75 wt. %; and in certain aspects, optionally about 1 to about 50 wt. %.

In certain aspects, at least one of the phases of the particle optionally further contains an additional additive or component, for example inorganic microcrystals, inorganic nanocrystals, quantum dots, biomolecules, cross-linkers, pharmaceutical compounds, molecular probes, and molecules that enable drug delivery (e.g., targeted or untargeted). In other aspects, multiple phases comprise may contain the same polymer, but differ in the additives present in each respective phase. One of the phases may contain a redox-active material, a conducting material, a charged material, or a material with chemical groups that can react with the surrounding environment, medium, or substrate after the particles are produced. Further, in certain aspects, the particle may contain materials that enable the generation of an electrical potential in response to application of energy or radiation, such as a light pulse, for example, or an electrical potential comparable to a typical cell potential. The particle may likewise have a preferential alignment towards a cell, so that a cell potential is applied. In other aspects, the particle optionally has a component or has one or more exposed phase surfaces that promotes self-assembly of the particle on a substrate by enabling the relative orientation of the particles on a surface or substrate to build a self-assembled architecture.

Thus, methods of forming the multiphasic particles comprising colorants via electrified jetting include using liquid jets having a micrometer or nanometer-sized diameter exposed to electro-hydrodynamic forces. In certain aspects, the method of making multiphasic particles comprises combining at least a portion of two or more liquid streams (e.g., liquid jets) together such that the two or more liquid streams contact over spatial dimensions sufficient to form a composite liquid stream having a multiphasic cone-jet of micrometer or nanometer sized dimensions. In some variations, the liquid streams are electrically conductive. The composite liquid stream, and in particular the cone-jet, is exposed to a force field sufficient to solidify the composite liquid stream (i.e., the cone-jet) into a successive plurality of particles having multiple phases formed from materials originating in the respective first and second streams. In some variations, the present methods provide the ability to form the composite liquid stream fragments into droplets that lead to forming select shapes of particles.

Methods of forming core and shell structures include the side-by-side type of electrohydrodynamic (EHD) co-jetting technology methods described in U.S. Publication No. 2006/0201390 and in PCT Publication No. WO 06/137936, both of which are entitled "Multi-phasic Nanoparticles" to Lahann et al., where the surface tension of respective two fluids being jetted, as well as the electric field application can be selected to promote formation of a core and shell structure. In various aspects, the use of the electric jetting methods of the disclosure provide greater control over the morphology and design of the colorant particles as opposed to other methods of forming particles (such as sonication during liquid jetting and the like). For example, the liquid jetting in the presence of an electric field of the present disclosure permits the use of immiscible materials as the first and second phases, as well as miscible materials. The broad use of such materials is possible due to the rapidity of formation of particles and shapes when an electric field is applied. For many conventional methods of formation, the respective phases require immiscibility between the phases; however the electric jetting methods employed here do not require such immiscibility, thus resulting in a significant advantage and providing a wider range of material selection. Further, the methods of forming the multiphasic particles by use of side-by-side electric jetting further provide a high degree of control over the ability to create a wide variety of shapes, including fibers and the like.

In this regard, the multiphasic colorant particles of prepared by electrohydrodynamic jetting techniques described above have a wide range of chemical, physical, and/or optical properties. Such multiphasic colorant particles can be designed to have pre-selected types and concentrations of colorants, particles receptive to external force fields, or other active ingredients. Any number of suitable colorants can be used. Moreover, the surface properties of each exposed phase of the multiphasic colorant particles can be tailored, as desired, to change the overall properties of the particles.

MPCs made in accordance with the electrohydrodynamic processes described above optionally have a wide range of optical properties. The optical properties of the MPCs are generally related to the type and concentration of colorant molecules in the respective compositions forming the phases or the optical properties of the exposed surface of one or more phases. As used herein, the term "colorant" is meant to include without limitation any material that provides an optical or visual effect, tint, or color to a material. The term is meant to include a single material or a mixture of two or more colorant materials. A red colorant emits electromagnetic radiation at a wavelength of about 625 nm to 740 nm; orange at about 590 nm to about 625 nm; yellow at about 565 nm to about 590 nm; green at about 520 nm to about 565 nm; blue or cyan at about 500 nm to about 520 nm; blue or indigo at about 435 to about 500 nm; and violet at about 380 nm to about 435 nm. A white colorant (achromatic colorant) generally reflects or emits a combination of all the colors of the visible light spectrum. A "substantially white" colorant gives the appearance of and/or is perceived as a white or grey shade, although the colorant may not exhibit true achromaticity.

Suitable colorant materials for use in accordance with the present teachings include, but are not limited to, dyes, pigments, and polymers. A "pigment," is generally an inorganic or organic, colored, white or black material that is usually substantially insoluble in solvents. A "dye," unlike a pigment, is generally soluble in a solvent or carrier. Pigments may be selected to have a particle size suitable for an application, for example, a maximum particle size that is small enough to avoid clogging of nozzles or capillaries during formation and of a smaller particle size than the particle dimensions. In certain aspects, the pigments have minimal deviation in particle size, i.e. have a narrow particle size distribution. Other suitable colorants include polymers, which may also form a structural component material of the MPC particle.

Suitable dye colorants include direct dyes (for substrates such as cotton, cellulosic and blended fibers), vat dyes (for substrates such as cotton, cellulosic and blended fibers), sulfur dyes (for substrates such as cotton and cellulosic fiber), organic pigments (for substrates such as cotton, cellulosic, blended fabrics, paper), reactive dyes (for substrates including cellulosic fiber and fabrics), disperse dyes (for synthetic fiber substrates), acid dyes (for wool, silk, paper, synthetic fibers, and leather substrates), azoic dyes (for printing inks and pigments), synthetic dyes, basic dyes (for silk, wool, and cotton substrates), fluorescent dyes, and phosphorescent dyes.

Suitable pigment colorants include by way of non-limiting example, pearlescent, metallic flake, cholesteric liquid crystal (CLC) pigments, ultramarine pigments, effect pigments, fluorescent pigments, phosphorescent pigments, inorganic pigments, carbon black pigments, natural pigments, organic pigments, mixed metal oxide pigments, iron oxide pigments, titanium dioxide pigments, organic azo pigments (such as azo lake pigments, insoluble azo pigments, condensed azo pigments, and chelate azo pigments), organic polycyclic pigments (such as phthalocyanine based pigments, anthraquinone based pigments, perylene based pigments, perinone based pigments, indigo based pigments, quinacridone based pigments, dioxazine based pigments, isoindolinone based pigments, quinophthalone based pigments, and diketopyrrolopyrrole (DPP) based pigments), dyeing lake pigments (such as lake pigments of acid or basic dyes), azine pigments; and the like. Further, suitable colorants may include surface-treated pigments.

In certain aspects, synthetic colorants include polymers, which may serve as a structural material of the particle, as well as a colorant. One suitable and non-limiting example is the class of poly(aryleneethynylene) (PAE) polymers, which are conjugated and stable solid polymers that can fluoresce in orange, yellow, green, and blue ranges, for example. Suitable examples of PAE fluorescent polymers include poly(p-phenylene), poly(p-phenyleneethynylene) (PPE) or poly(p-phenylenevinylene) and derivatives thereof, including those derivates having alkyl, alkyl phenyl, and alkoxy groups such as grafted PPE and dioctyl-PPE, or ternary benzothiadiazole-co-alkyne-co-alkyne substituted backbones. Other suitable conjugated polymers include polythiophene and polyaniline, by way of example.

Particularly suitable colorants for the MPCs include low-molecular weight dyes, such as laser dyes, textile dyes, paint dyes and pigments, coating dyes and pigments, plastic colorants, metal colorants, ceramic colorants, fluorescent or phosphorescent dyes, fluorescent polymers, natural dyes, polymeric dyes, inorganic or organic pigments, or mixtures thereof.

Hence, a variety of colorants is known to those of skill in the art and is suitable for use in accordance with the present disclosure. By way of non-limiting example, suitable colorants include Color Index (C.I.) (published by the Society of Dyers and Colourists): C.I. Pigment Yellow 14, 93, 95, 109, 110, 120, 128, 138, 139, 151, 154, 155, 173, 180, 185 and 193, C.I. Direct Yellow 8, 9, 11, 12, 27, 28, 29, 33, 34, 35, 37, 39, 41, 42, 44, 50, 53, 58, 59, 68, 86, 87, 93, 95, 96, 98, 100, 106, 108, 109, 110, 130, 132, 142, 144, 161, 163; C.I. Acid Yellow 17, 19, 23, 25, 39, 40, 42, 44, 49, 50, 61, 64, 76, 79, 110, 127, 135, 143, 151, 159, 169, 174, 190, 195, 196, 197, 199, 218, 219, 222, 227; C.I. Reactive Yellow 2, 3, 13, 14, 15, 17, 18, 23, 24, 25, 26, 27, 29, 35, 37, 41, 42; C.I. Basic Yellow 1, 2, 4, 11, 13, 14, 15, 19, 21, 23, 24, 25, 28, 29, 32, 36, 39, 40; C.I. Pigment Orange 13, 16, 34, 36, 43, 61, 63 and 71; C.I. Pigment Green 7, C.I. Pigment Red 101, 108, 122, 202, 254; C.I. Direct Red 2, 4, 9, 23, 26, 31, 39, 62, 63, 72, 75, 76, 79, 80, 81, 83, 84, 89, 92, 95, 111, 173, 184, 207, 211, 212, 214, 218, 221, 223, 224, 225, 226, 227, 232, 233, 240, 241, 242, 243, 247; C.I. Acid Red 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 361, 396, 397; C.I. Reactive Red 3, 13, 17, 19, 21, 22, 23, 24, 29, 35, 37, 40, 41, 43, 45, 49, 55; C.I. Basic Red 12, 13, 14, 15, 18, 22, 23, 24, 25, 27, 29, 35, 36, 38, 39, 45, 46; C.I. Pigment Blue 27, 29, 15:1, 15:2, 15:3, 15:4, 15:6, 17:1; C.I. Direct Blue 1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289, 291; C.I. Acid Blue 9, 25, 40, 41, 62, 72, 76, 78, 80, 82, 92, 106, 112, 113, 120, 127:1, 129, 138, 143, 175, 181, 205, 207, 220, 221, 230, 232, 247, 258, 260, 264, 271, 277, 278, 279, 280, 288, 290, 326; C.I. Reactive Blue 2, 3, 5, 8, 10, 13, 14, 15, 17, 18, 19, 21, 25, 26, 27, 28, 29, 38; C.I. Basic Blue 1, 3, 5, 7, 9, 22, 26, 41, 45, 46, 47, 54, 57, 60, 62, 65, 66, 69, 71; C.I. Pigment Violet 19, 23 and 33; C.I. Direct Violet 7, 9, 47, 48, 51, 66, 90, 93, 94, 95, 98, 100, 101; C.I. Acid Violet 5 34, 43, 47, 48, 90, 103, 126; C.I. Reactive Violet 1, 3, 4, 5, 6, 7, 8, 9, 16, 17, 22, 23, 24, 26, 27, 33, 34; C.I. Basic Violet 1, 2, 3, 7, 10, 15, 16, 20, 21, 25, 27, 28, 35, 37, 39, 40, 48; C.I. Pigment Black 7; C.I. Direct Black 9, 17, 19, 22, 32, 51, 56, 62, 69, 77, 80, 91, 94, 97, 108, 112, 113, 114, 117, 118, 121, 122, 125, 132, 146, 154, 166, 168, 173, 199; C.I. Acid Black 7, 24, 29, 48, 52:1, 172; C.I. Reactive Black 4, 5, 8, 14, 21, 23, 26, 31, 32, 34; C.I. Basic Black 7, and 8; and C.I. Pigment White 4, C.I. Pigment White 18, and C.I. Pigment White 21.

In ink applications, a colorant set that provides full-color complement for printing images, includes colorants for cyan, magenta, yellow, and black or "key" (CMYK). For example, C.I. Pigment Yellow 138, 151, 154, 180 and 185 may be used as the yellow colorant in ink applications. Other examples of exemplary yellow dyes suitable for use in the MPCs include aryl- and heterylazo dyes having phenols, naphthols, anilines, pyrazolones, pyridones or open chain active methylene compounds as coupling components, azomethine dyes having open active chain methylene compounds as coupling components, methine dyes such as benzylidene dye and monomethine oxonol dye, and quinone dyes such as naphthoquinone dye and anthraquinone dye. Other examples of the yellow dye employable herein include quinophthalone dyes, nitro-nitroso dyes, acridine dyes, and acridinone dyes. Such dyes typically exhibit yellow color when the chromophore undergoes partial dissociation. The counter cation in this case may be an inorganic cation such as alkaline metal ion and ammonium ion or an organic cation such as pyridinium ion and quaternary ammonium salt ion, or a polymer cation having such cations as partial structure.

Examples of magenta colorants, suitable for use in MPCs used in ink applications, include C.I. Pigment Red 122 and 202, 254, C.I. Pigment Violet 19; aryl- and heterylazo dyes having phenols, naphthols or anilines as coupling components, azomethine dyes having pyrazolones or pyrazolotriazoles as coupling components, methine dyes such as arylidene dye, styryl dye, melocyanine dye and oxonol dye, carbonium dyes such as diphenylmethane dye, triphenylmethane dye and xanthene dye, quinone-based dyes such as naphthoquinone, anthraquinone and anthrapyridone, and condensed polycyclic dyes such as dioxazine dye. Again, such dyes typically exhibit magenta color when the chromophore undergoes partial dissociation. The counter cation in this case may be an inorganic cation such as alkaline metal ion and ammonium ion or an organic cation such as pyridinium ion and quaternary ammonium salt ion, or a polymeric cation having such cations as partial structure.

In yet other examples, cyan colorants for the MPCs are optionally selected from C.I. Pigment Blue 15; azomethine dyes such as indoaniline dye and indophenol dye, polymethine dyes such as cyanine dye, oxonol dye and melocyanine dye, carbonium dyes such as diphenylmethane dye, triphenylmethane dye and xanthene dye, phthalocyanine dyes, anthraquinone dyes, aryl- and heteryl azo dyes having phenols, napthols or anilines as coupling components, and indigo-thioindigo dyes. These dyes typically exhibit cyan color when the chromophore undergoes partial dissociation. The counter cation in this case may be an inorganic cation such as alkaline metal ion and ammonium ion or an organic cation such as pyridinium ion and quaternary ammonium salt ion, or a polymeric cation having such cations as partial structure.

For black ("K") colorants suitable for use in ink applications, an acidic or neutral pigment of C.I. Pigment Black 7, carbon black, magnetite, and aniline black and/or polyazo dye are all suitable options.

In certain embodiments, colorants are optionally selected which are approved for incorporation into a food, drug, or cosmetic by a regulatory agency, such as FD&C or D&C pigments and dyes approved by the Federal Drug Administration (FDA) for use in the United States. Food-safe and/or cosmetically acceptable colorants among those useful herein include FD&C Red No. 3 (sodium salt of tetraiodofluorescein), Food Red 17, disodium salt of 6-hydroxy-5-{(2-methoxy-5-methyl-4-sulphophenyl)azo}-2-naphthalenesulfonic acid, Food Yellow 13, sodium salt of a mixture of the mono and disulphonic acids of quinophtalone or 2-(2-quinolyl)indanedione, FD&C Yellow No. 5 (sodium salt of 4-p-sulfophenylazo-1-p-sulfophenyl-5-hydroxypyrazole-3 carboxylic acid), FD&C Yellow No. 6 (sodium salt of p-sulfophenylazo-B-naphtol-6-monosulfonate), FD&C Green No. 3 (disodium salt of 4-{[4-(N-ethyl-p-sulfobenzylamino)-phenyl]-(4-hydroxy-2-sulfoniumphenyl)-methylene}-[1-(N-ethyl-N-p-sulfobenzyl)-Δ-3,5-cyclohexadienimine], FD&C Blue No. 1 (disodium salt of dibenzyldiethyldiaminotriphenylcarbinol trisulfonic acid anhydrite), FD&C Blue No. 2 (sodium salt of disulfonic acid of indigotin), and mixtures thereof in various proportions. In certain aspects, the colorant comprises a cosmetically and/or pharmaceutically acceptable water insoluble inorganic pigment, such as titanium dioxide, chromium oxide green, phthalocyanine green, ultramarine blue, ferric oxide, or a water insoluble dye lake. In certain embodiments, dye lakes include calcium or aluminum salts of an FD&C dye such as FD&C Green #1 lake, FD&C Blue #2 lake, D&C Red #30 lake and FD&C # Yellow 15 lake. In yet other embodiments, a white colorant is used, for example titanium dioxide ($TiO_2$), titanium dioxide coated mica, a mineral, or a clay.

The amount of colorant included in each respective phase of the MPCs will depend on the selection of the colorant and its properties as well as the desired hue, saturation, and value. In certain aspects, a sufficient amount of colorant is included to attain the desired color density or optical effect in the respective phase of the MPC. In certain aspects, the colorant is present in the respective phase at optionally less than or equal to about 95 wt. %; optionally less than or equal to about 85 wt. %; optionally less than or equal to about 75 wt. %; optionally less than or equal to about 65 wt. %; optionally less than or equal to about 55 wt. %; optionally less than or equal to about 50 wt. %; less than or equal to about 45 wt. %; optionally less than or equal to about 40 wt. %; optionally less than or equal to about 35 wt. %; optionally less than or equal to about 30 wt. %; optionally less than or equal to about 25 wt. %; optionally less than or equal to about 20 wt. %; optionally less than or equal to about 15 wt. %; optionally less than or equal to about 10 wt. %; optionally less than or equal to about 5 wt. %; optionally less than or equal to about 3 wt. %; optionally less than or equal to about 1 wt. %; and in certain aspects less than or equal to about 0.5 wt. %. In certain aspects, each respective phase in the particle comprises about 0.1 to about 95% by weight of colorant of the total phase composition; optionally about 0.5 to about 50 wt. %; optionally about 1 to about 25 wt. %, and in certain aspects, optionally about 3 to about 15 wt. %.

Moreover, the surface properties of each phase of the MPC can be tailored in a manner that provides control over the overall properties of the MPCs. By variation the concentrations of colorants in the phases of the MPCs and by including colorants for each of the primary colors, MPCs of virtually any color can be obtained. Moreover, the MPCs in accordance with the present teachings produce additional optical effects such as sheen, angular color variations, and translucence, if desired.

In a variation of this embodiment, side-by-side dual capillaries can be used for the electrified jetting process to create biphasic colorants. Through each jetting capillary (nozzle), portions of two chemically distinct jetting liquids are combined in a composite stream fed into a region having a force field present, and in particular an electric field. Each of the two jetting liquids can be composed of similar components to those typically used in one-phasic particle production. In order to induce distinct characteristics in each phase, different dopants (additives and optionally colorants) are incorporated for each jetting liquid. The structural components, the polymer or polymer solution, for each liquid stream may be the same or different. In a further refinement, alternate colorants may have a core-shell geometry. In another variation, the colorants are set into their final geometry by a post-treatment step, such as thermal annealing or treatment with light or other forms of energy.

In another aspect of the present disclosure, the multiphasic particle comprises three different phases created by using three jetting liquids that are fed through three jetting capillaries. The principles that apply to dual capillary electrified jetting discussed above are equally applicable to a set-up with three of more capillaries (liquid jet streams) that are combined to form a composite stream. For example, the geometry of the three capillaries can be varied in several different ways, such as arranging the capillaries in a triangular arrangement. In this case, three different material systems (which may contain dopant mixtures) can be incorporated in each of the three phases of the particle, all of which are exposed to the periphery of the colorants. In another variation, the capillary geometry is created by inserting side-by-side dual capillaries into an outer capillary. This combined geometry of biphasic and core-shell jetting produces triphasic colorants with interesting internal materials distribution. For example, if the two inner (core) liquids are used for inducement of colorants and additives, the resulting colorants behave similar to biphasic colorants. The third outer (shell) liquids can be used for an inducement of encapsulating layer, which can protect colorants in an internal core region from exposure to any incompatible media and/or can enhance the suspending capability of the MPCs by controlling the surface characteristics of exposed surfaces of the MPCs.

As noted previously, the present disclosure contemplates multiphasic colorant particles having more than three phases. Extension of the biphasic and triphasic electrified jetting techniques described above uses more than three jetting capillaries for employing more than three phases into the colorants. In certain aspects, in order to ensure that all the jetting liquids are involved in the production of every colorant, in other words, to prevent a situation where each MPC is composed of a different combination of phases, the geometry of the capillaries is configured such that the jet is ejected out from the junction point of all the jetting liquid phases in the Taylor cone.

In other variations of the present disclosure, the MPCs have non-spherical shapes. As set forth above, the electrified jetting process is governed by complex parameter windows. Variation of these parameters, allows creating a cone-jet mode that is appropriate for the multi-capillary jetting, among various jetting modes. Variation of these parameters, also allows control of the shape of the resulting particles. The possible morphology of the MPCs formed in accordance with these techniques includes nanoscale or microscale components selected from the group consisting of: spheres, rectangles, polygons, disks, ellipsoids, toroids, cones, pyramids, rods, cylinders, beads-on-a-string, and fibers.

The MPCs are particularly suitable for use as pixels in optic display applications or to create an optic feature, such as those shown in FIGS. 2A-D. The displays are created by controlling the relative orientation of plurality of MPCs to the surface and to each other. The change in particle orientation is due to the influence of the controllable, external force field. Thus, in accordance with the present teachings, a multiphasic particle constituting at least a portion of the plurality of particles in the display component has at least one phase which comprises a material or component that is receptive to a controllable external force field, such as electric fields, magnetic fields, pressure, sonication, light, and the like. In certain preferred aspects, such a force field is a magnetic field. Thus, in response to the switching or other alteration of the transmitted field, re-orientation of at least a part of the MPCs is observed, which results in a change in optical properties of the display pixel. Each pixel consists of a plurality of at least one type of MPC, but may include multiple different types of MPCs. With such a technology, changes in the surface properties can be amplified to induce changes in color, as it is needed for advanced color displays.

Anisotropic magnetic microcylinders are prepared to display two distinct phases or compartments, which are loaded with two different colorants. One of the phases (to the exclusion of the other phase) further comprises a particle that is responsive to an external magnetic field, e.g., magnetite. Synchronization of these microcylinders, a prerequisite for optically observable color changes, can be achieved through a magnetic field gradient induced by a single magnet. Moreover, the magnetically switchable microcylinders enable a magnetophoretic color display based on interfacial particle switching. Magnetophoretic switching of anisotropic magnetic particles is fully reversible and yields clear, optical color changes.

Surfaces are typically characterized by a permanent set of properties, such as color, hydrophilicity, or surface texture. However, a number of reversible switchable surfaces exist, many of which have had important scientific and technological implications. In those exceptions, two or more stable states are present and toggling between these states is classically triggered by the application of a defined stimulus, such as an electrical field. Reversible switching of the orientation of liquid crystal (LC) polymers with electric fields forms the foundation of modern LC displays and the electrophoretic switching of pigments has resulted in electrophoretic displays. While the vast majority of these conventional switches exploit electrical fields, a number of alternate stimuli can likewise drive surface switching, including magnetic fields. In the past, the use of magnetic fields for surface switching has been hampered by the lack of suitable anisotropic transduction units and simple operational procedures.

In certain aspects, the present disclosure provides for synthesis and magnetophoretic switching of novel anisotropic magnetic particles. These anisotropic multiphasic Janus-type particles are color-encoded to enable optical observation of the surface switching. Taking advantage of the magnetic anisotropy of these particles, a simple switching configuration allows for synchronization of the rotational orientations of the anisotropic multiphasic particles.

While magnetic anisotropic multiphasic particles can undergo rotation-induced translational motion under diluted conditions and assemble into chains at higher concentration, optically observable color changes require highly synchronized particle motion. The motion and interaction of magnetic anisotropic particles are a function of the size, shape, and internal distribution of the magnetic content. While compartmentalization of two optically distinct phases is necessary for color switching, the existence of two phases/compartments also increases the translational and rotational degrees of freedom of the particles from 3 to 6. This implies that the accurate manipulation of the particle orientation requires more external control parameters than for a non-compartmentalized particle. In certain aspects, a single external force field, which consists essentially of a magnetic field for example, can be used to provide excellent control over anisotropic multiphasic particle orientation. In certain aspects, a single magnet is employed as a force field generator to control the orientation of anisotropic magnetic particles and thus impart a high degree of operational simplicity.

In FIGS. 8A and 8B, one exemplary embodiment of anisotropic multiphasic colorant particles (MPCs) is illustrated using a general principle of an external field transmitted to the display component. A plurality of anisotropic MPCs 250 each have a first phase 252 and a visually or optically distinct second phase 254. The MPCs 250 have a dipole moment (shown by the arrow), for example by including a charged moiety or species in the first phase 252 (or by treating the surface of the first phase 252 to have a charge). The plurality of MPCs 250 is disposed on a surface of a substrate 260. The substrate 260 is in electrical communication with an EMF source 262, which establishes an electric field or potential (in FIG. 8A a positive charge along the substrate 260). In FIG. 8A, the second phase 254 is exposed along the substrate surface 260 and exhibits the colorants contained in the second phase 254. In FIG. 8B, the polarity of charge of the substrate 260 is reversed by reversing the polarity of the EMF source 262. Thus, in FIG. 8B, the substrate 260 has a negative charge and the second phase 254 is oriented towards the charged substrate surface, while the repelled first phase 252 is exhibited along the surface. Thus, in a variety of applications, anisotropic or visually distinct MPCs are used to modify the appearance of an object by controlling the relative orientation of the MPCs to the surface of a substrate. For example, the control of the orientation is achievable by switching controllable external fields, like electrical fields or magnetic fields. Where the MPCs are used in such applications, the particles are formed with different phases having charged components or a distribution of magnetic elements. In another aspect, the present teachings contemplate using light to activate the dipole moment of the MPC by inducing temporary charge transport from one phase of the MPC to another phase.

In certain aspects, the MPCs suitable for use in the optic displays of the present disclosure comprise colorants including low-molecular weight dyes. Many paints include either inorganic pigments or polymeric dyes as colorant. Because inorganic pigments have limited brightness and in certain applications may be less effective, replacements are of commercial interest. Low-molecular weight dyes are often discussed as replacement candidates because of their enhanced brightness and wide availability. However, low molecular weight dyes have high mobility and often result in leaching of the dye. Polymeric versions of these dyes are therefore often used despite the potentially higher cost sometimes associated with these dyes. Thus, MPCs provide a simple way of manufacturing pigments of organic dyes with high brightness and high color density without the disadvantage of dye mobility, because the dye is trapped in one or more phases of the MPC and is protected from interaction with the surrounding environment preventing or minimizing leaching or inactivation of the colorant. Moreover, a wide range of colors and color effects can be achieved by simply combining one or more dye additives in each phase of the MPCs.

In certain aspects, white colorants are used in white, opaque paint applications in lieu of white pigments (e.g., $TiO_2$). In one aspect, MPC exhibiting white color are made of purely organic materials rather than inorganic materials, prepared by the methods described above. A substantially white color (low density) is generated by combining three or more organic dyes in a single MPC, instead of using heavy and abrasive inorganic $TiO_2$ particles. In certain aspects, the dyes may be a combination of primary colors. These dyes can be either mixed together in a single phase MPC or incorporated in each respective phase of an MPC. Thus, multiphasic particle colorants optionally include a first phase, a second phase, and a third phase, where the first phase comprises a first dye, the second phase comprises a second dye, and the third phase comprises a third dye. In certain aspects, producing the multiphasic particle colorant that emits a substantially white color includes selecting the first dye to exhibit a red or orange color, the second dye to exhibit a blue, cyan, indigo, or violet color, and the third dye to exhibit a yellow or green color. For example, triphasic colorants include fluorescent dyes that have an emission wavelength range of three additive primary colors (e.g., blue, green and red). In this example, each phase includes a single color dye or colorant. When these colorants are illuminated with a fluorescent lamp, the three dyes in each phase emit their pre-selected colors and the additive primary colors produce white-colored light.

As set forth above, a number of additives, in addition to colorants, may be included in the various phases of the particles of the disclosure. Therefore, such additives must also be included in one or more of the liquid streams used to form the micro-objects or nano-objects. In one variation, quantum dots which have specific electronic, magnetic, optical or biomedical properties on only one side of a micro-sphere, nano-sphere, micro-fiber, or nanofiber may be incorporated. In addition, one of the most attractive features of this system is relatively low cost and ease of production for this multifunctionality.

In another embodiment of the present disclosure, multiphasic particles made by the methods set forth above are used as building blocks for hyper structures. For example, a monolayer of biphasic spheres can act as a switchable surface which responds to the application of an external force field (electric or magnetic). As noted above, the MPCs can be used in the functioning of an optic display based on biphasic monolayers.

As shown in FIG. 7, various switchable particles system configurations are contemplated. In one embodiment, a first phase 202 of an anisotropic multiphasic microparticle 200 is loaded with magnetic particles thereby creating a structure that is switchable with an external magnetic field. A second phase 204 is optically distinct from the first phase 202 and may contain a colorant. When the magnetic field is off, the plurality of anisotropic multiphasic microparticles 200 are randomly distributed. However, when the magnetic field is switched on, the plurality of anisotropic multiphasic microparticles 200 are all highly oriented with respect to one another (have a common orientation or direction), so that the first phase 202 is exposed so as to define an optic feature.

In a second embodiment, electron donors are included in one phase and electron acceptors in a second phase to produce a dipole moment which may be switched with an electric field. In each of these variations, a device having a display may be formed by incorporating a suitable colorant in each phase. Therefore, for example if triphasic particles are utilized with each phase having a colorant for one of the three primary colors, a display incorporating such a triphasic particle can attain nearly every color desired for optical displays in electronic devices, for example. Notably, the present teachings also contemplate controllable fields that provide gradients of energy, thus providing greater spatial control over the orientation of anisotropic MPCs, such that the field is not limited to those that "switch" on and off or reverse polarity, but rather may provide relatively greater amounts of energy in an exemplary system to impact the relative orientation of the MPC particle, as desired. The components which are receptive to the external controllable field in the MPC may likewise be disposed within the MPC in concentration gradients that correspond to the desired orientation based on the applied gradients of external energy fields. In this manner, even greater control over the orientation of an anisotropic MPC with respect to the substrate is provided.

A permanent magnet makes a magnetic particle move toward the magnet when the magnet closely approaches the particle, which is known by magnetophoresis (see Equations (1) and (2)).

$$U = -\frac{(\chi_p - \chi_m)}{2\mu} V B^2 \quad \text{Equation (1)}$$

$$F = -gradU = \frac{(\chi_p - \chi_m)}{2\mu_o} V (B \cdot \nabla) \cdot B \quad \text{Equation (2)}$$

Magnetic potential energy (U) of magnetic particle (volume, V and volume magnetic susceptibility, $\chi_p$) in a liquid medium (volume magnetic susceptibility, $\chi_m$) under a magnetic field (B) can be described by Equation (1), where $\mu_o$ is vacuum magnetic permeability. As a result, a magnetic force (F) coerces a magnetic particle as expressed in Equation (2), explicating that the force is a function of gradient magnetic field at a given condition. Such a magnetic gradient force is indeed inherent in a permanent magnet, which can be used for a second drift to rule the orientation of a magnetic phase or compartment of a particle in a device.

FIG. 1A is a simplified illustration of this principle, showing a magnetically switchable optic display 20. Initially, a multiphasic particle 22 having a cylindrical morphology display two different colorants in each respective phase or compartment 24, 26 is randomly sitting on the bottom of an optically transparent housing 28 (e.g., a glass box) filled with a liquid medium 30 in the absence of any magnetic field (indicated as $S_1$). As a rectangular shaped magnet 32 closely approaches a top of the housing 28, while maintaining the magnetic north direction vertical to the housing 28, the longer side of aligned magnetic anisotropic multiphasic microcylinders in the magnetic field becomes parallel to the magnetic field direction (signified as $S_2$ or $S_3$). At the same time, magnetophoresis in the external magnet 32 keeps attracting the magnetic anisotropic multiphasic microcylinders 22 to advance toward the top of the housing 28 in a way the magnetic compartment (black colored) 26 in the particle faces toward the magnet side (denoted as $S_3$). Here, the potential energy (U) imbalance between $S_2$ and $S_3$ in the presence of the magnet 32 leads to the magnetic phase/compartment 26 in the particle 22 to be closer to the magnet 32 than the non-magnetic phase/compartment 24. Hence, magnetophoresis along with appropriate magnetic field direction in a single magnet makes it possible to control the magnetic bi-compartmentalized multiphasic microcylinder orientation. Where nano-components or micro-components having two or more optically distinct phases or compartments are employed with such a device, it is thus possible to have a high degree of control over orientation of the particles, thereby being able to have control over the optical display.

Accordingly, the magnetic phases/compartments in the particles can be synchronized, even at a high concentration that can cover all the surface area of a given substrate, by means of an appropriate manipulation of single magnet. Thus, one of two bulk colors imprinted in or forming part of the particles can be optically or visually distinguished at one time. This concept is implemented a magnetically switchable optic display, appearing in FIGS. 1B-C. The magnetic bi-compartmentalized or bi-phasic microcylinders having yellow/black colorants are loaded in a display device contoured with the letters "M," where the wall is composed of laser-cut silicone rubber and the top and bottom are glass slides, as discussed further below. Approaching the top of the display of a housing with the permanent magnet by the method described in the context of FIG. 1A provides an optical color change of Janus (multiphasic anisotropic) particles induced to show a black letter of "M" (see FIG. 1B), whereas placing the magnet on the bottom of the optical device results in a yellow letter of "M" (see FIG. 1C). It should be noted that these optical switching events are reversible and limitlessly reproducible, as long as chemical/physical conditions of the device are maintained.

FIG. 1A shows the general principle of color switching of magnetic bi-compartmentalized multiphasic microparticles having a cylindrical morphology; when the magnet with parallel magnetic pole approaches the magnetic bi-compartmentalized microcylinders in a housing, the magnetite phases/compartments of the particles migrate towards the external magnet due to its lower potential energy while the longer side of MJMC orientates onto the horizontal plane (magnetic field direction). FIG. 1B shows that when the magnet is positioned at the top of a device, a large population of multiphasic microcylinders synchronizes their magnetic compartments and move toward the top to represent a black optical color of letter "M." FIG. 1D shows that when the magnet is placed at the bottom of the device, the multiphasic microcylinders migrate downward to uncover the yellow optical color of letter "M."

In still another aspect of the present disclosure, donor/acceptor structures with a biphasic architecture are provided. In this embodiment, inorganic nanoparticles are incorporated as photoactive carriers. These inorganic nano-particles are used because of their electrical conductivity (generally required for efficient charge separation). Moreover, these materials have electrical and optical properties that can be adjusted by varying the particle size and form densely packed layers. Finally, such materials are environmentally more stable than many colorants or proteins.

Examples of useful inorganic materials include CdTe and CdS nano-particles. These materials have been shown to be an excellent source of photo-potential and used in solar cells. Moreover, these junctions exhibit one of the highest photo-potentials observed for photoactive thin films. Because the energy of the valence and conduction bands in multiphasic particles can be controlled by varying their diameter, one can further increase the photo-potential by selecting CdS and CdTe particles with optimal position of energy levels with respect to each other. The optical and electronic properties of CdTe and CdS multiphasic particles can be changed gradually by varying their diameter. As the particle size decreases, the energy gap between the top of the valence band ("VB") and the bottom of the conduction band ("CB") increases, which is termed the quantum size effect. The ability to vary the relative position of the CB and VB of CdTe and CdS enables desirable maximization of charge separation in the biphasic particles. By way of example, such particles can be formed in accordance with present disclosure by preparing aqueous solutions of CdTe and CdS nano-crystals capped with thioglycolic acid or citrate ions.

Example 1

Preparation of Anisotropic Multiphasic Particles

Jetting solutions are prepared as follows. Materials include poly(lactide-co-glycolide) (PLGA) polymer with a lactide:glycolide ratio of 85:15 (molecular weight (MW) of 50,000-75,000 g/mol, catalog number 430471)), ethylene glycol (catalog number 293237), Tween 20 (catalog number P1379), Tween 80 (catalog number P1754) chloroform (catalog number 650498), and N,N-dimethylformamide (DMF, catalog number 648531) are obtained from Sigma-Aldrich, Inc. Yellow colorant (high strength opaque yellow 14) is commercially available from GFS Chemicals. Carbon black (CB) pigment is purchased from General Carbon Company. Magnetite (iron oxide nanocrystals in chloroform, 28 nm, catalog number SOR-30-50) is commercially available from Ocean NanoTech, LLC. All reagents are used as received without further purification.

Two PLGA solutions are prepared by dissolving PLGA (30 w/v %) in a mixture of chloroform and DMF (95:5, v/v) respectively. A suspension of magnetite in chloroform is added into one of two PLGA solutions at a concentration of 0.9 w/v %. Finally, two different optical dyes, yellow pigment (10 w/v %) and carbon black (CB) (2 w/v %) suspended in chloroform, are respectively mixed with two PLGA solutions, where CB is added into a PLGA solution containing magnetite. Here, the concentrations denote the final amount in the jetting suspensions.

Electrohydrodynamic Co-Jetting Procedure

The two jetting suspensions are separately pumped through a dual capillary system (capillary diameter: 23 gauge, catalog number 7018308, Nordson EFD) held together at side-by-side. The capillaries are connected to the cathode of a DC voltage source (Gamma High Voltage Research, USA) and the flow rate is controlled via a syringe pump (Kd Scientific, USA). A flat piece of aluminum foil is used as a counter electrode. The distance between the capillary tip and the substrate is maintained in the range of 10-15 cm. All experiments are performed at room temperature (23-25° C.). The two polymer solutions are delivered at a constant flow rate of 0.05 ml/h with a driving voltage of 10 kV. The resulting fibers with about 250 µm in diameter are collected and dried under vacuum for overnight.

Multiphasic Microcylinder Preparation

The dried microfibers embedded in a medium (Tissue-Tek O.C.T. Compound, Andwin Scientific, USA) are mounted onto a cryostat chuck at −20° C., and sectioned by a cryostat microtome (HM550 OMC, Microme) to produce multiphasic microcylinders with 500 µm in length. The resultant particles are suspended in an aqueous solution containing Tween 20 (2 w/v %).

Example 2

Preparation of Optical Devices

Cutting Optical Device Shapes. Four different geometries are drawn using SolidWorks DWGeditor software. These included two logos with characters (IQT (FIG. 2A) and 7SB (FIG. 2B)), a simple square (FIG. 2C), and a grid of four squares (FIG. 2D), also known as the checkerboard pattern.

Glass slides (3 inches×1 inch×1 mm, catalog number 12-544-1) and Alconox (catalog number 50821288) are purchased from Thermo Fisher. Silicone sheets (having respective thicknesses of 1/16 inches (0.0625 inch) and 0.02 inches, part numbers 86915K56 and 86915K52, respectively) are purchased from McMaster Carr. Double-sided tape (3M™ part number 1513) is purchased from Converters, Inc. A magnet (catalog number BZX0X0X0, 4 inch×1 inch×1 inch thick, NdFeB, and 4871 Gauss of surface field) is a product of K & J Magnetics, Inc. BD disposable syringe (5 ml, catalog number 309603) and Hamilton replacement needle (26 gauge; 0.018 in. OD; 0.010 in ID, catalog number 91026) are purchased from Fisher Scientific. Glue (LOCTITE®) is commercially available from Henkel Consumer Adhesives Inc.

The silicone and tape are cut by printing the drawings in vector mode using an Epilog Zing 16 Laser. The laser speed, power, and frequency settings for the 1/16 inch and 0.02 inch thick silicone are 50%, 45%, and 1000 Hz respectively. For the double sided tape, the settings are 100%, 15%, and 500 Hz respectively.

Cleaning Cut Parts

Following cutting, the silicone parts are cleaned by first hand-scrubbing with a 1% w/v Alconox solution and rinsing with water to remove the bulk of the ash. The parts are then placed in a sonicator bath (VWR model P250D) containing 1% w/v Alconox and sonicated for at least 5 minutes. The parts are removed from the sonicator and rinsed again with tap water before drying with paper towels.

Optical Device Assembly

Figure 2A:
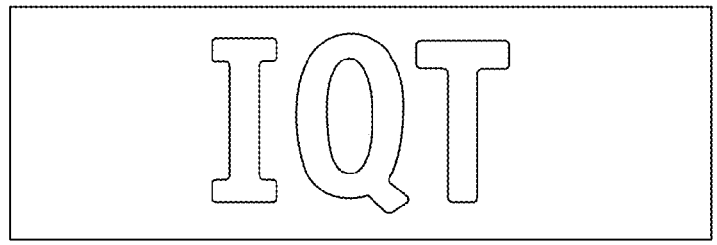
FIGS. 2A-2D depict exemplary patterns or geometries of different optic features for optical devices that comprise a plurality of anisotropic multicompartment microparticles, including the characters: IQT (2A) and 7SB (2B) and the shapes of a square (2C) and checkerboard (2D)
Figure 2B:
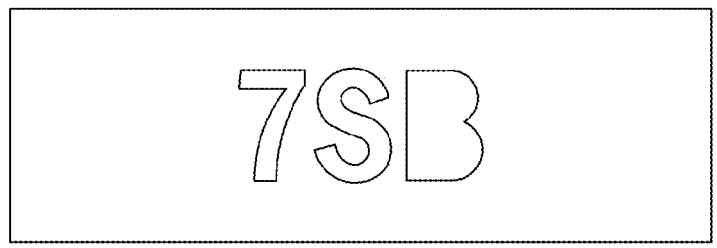
Figure 2C:
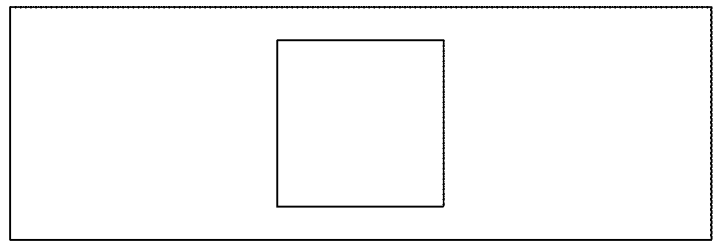
Figure 2D:
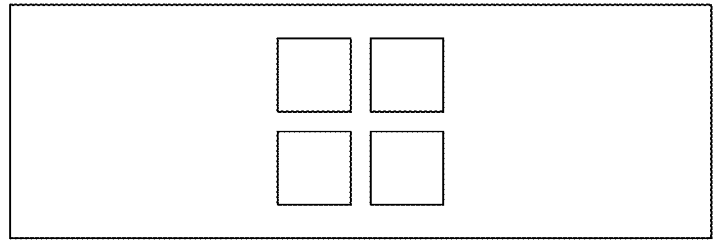
Figure 3:
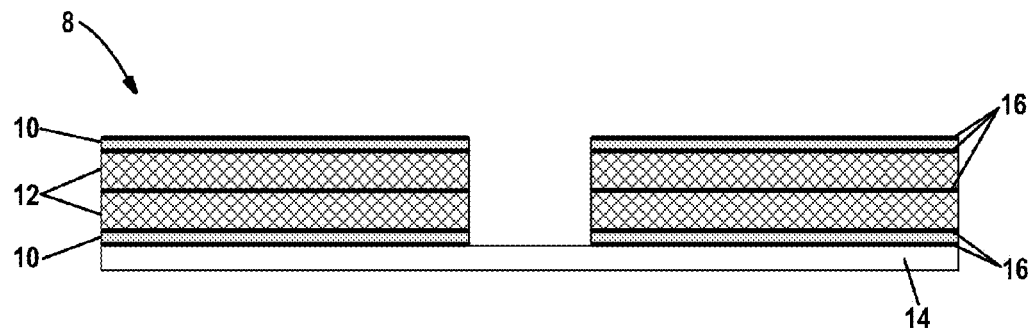
FIG. 3 is a cross-sectional view of layers in an exemplary optical device prepared in accordance with certain aspects of the present disclosure.

With reference to FIG. 3, in one embodiment, the parts for a demonstrator optical display device 8 can be assembled as follows. A piece of double-sided tape 16 is laminated onto a glass slide 14. The surface of a piece of 0.02 inches thick silicone 10 is first treated with a high frequency generator (Electro-Technic Products, Inc., Model BD-20) and then laminated to the double-sided tape 16 on the glass slide 14. A second piece of double-sided tape 16 is laminated to the other side of the 0.02 inches thick silicone 10. The surface of a piece of 1/16 inches thick silicone 12 is treated with the high frequency generator and then laminated to the double-sided tape 16. A third piece of double sided tape 16 is laminated to the other side of the 1/16 inches thick silicone layer 12. A second piece of 1/16 inches thick silicone 12 is treated with the high frequency generator and laminated to the other layers followed by a fourth piece of double-sided tape 16. Finally, a second piece of 0.02 inches thick silicone 10 is treated with the high frequency generator and laminated to the other layers followed by a final piece of double-sided tape 16 laminated to the top of the device. FIG. 3 shows a cross section view of the layers in the device according to this embodiment.

Loading Particle Suspension

The particles are suspended in a mixture of ethylene glycol and Tween 80 (2:1, v/v). The particle suspension is loaded into given well(s) (e.g., optic features) in the device, where a magnet is placed on the bottom of the device in order to keep the particle sinking in the well, whereas the liquid is over-floated by keep adding the particle suspension until the particles covered all the surface of well(s). Once the particles are fully loaded, a volume of medium liquid is determined by when the meniscus is forming at the top of well(s).

Finishing Optical Devices

First, a glass slide (top) is laminated to the top of the double-sided tape Air bubbles formed in between the top glass and well(s) are removed by keep injecting extra medium through the wall of device (silicone parts) using a syringe and needle until all the bubbles disappeared. The device is cleaned by Kimwipe tissues and acetone-wetted Kimwipe. The device is dried and sealed around the silicone parts using an adhesive (LOCTITE® Super Glue). Any unnecessary residual adhesive after dried is scraped by a razor. The optical device is finished by water-wetted tissues and dried.

In certain aspects, the present technology contemplates methods of operating the optical device with a magnet to observe optical color switching, which involves the following considerations. The first (1) consideration is the selection of an appropriate magnet. A magnet shape, size, and surface field strength are key parameters to appropriately operate and optimize demonstrator optical device performance. Second, the operating magnet position can be varied while the optical device is sitting on it. Third, the optical device can be moved with respect to the magnet, which is in a dedicated and fixed position. Therefore, magnet selection is done first. Appropriate positioning of the magnet is also important, as is properly operating the magnet and the optical devices to maximize the effectiveness of color changing.

Magnet Selection

A magnet is optionally selected to have a rectilinear shape, for example, a block magnet in a rectangular or cubic shape, as shown in FIG. 4. In one exemplary variation, a wide magnet 100 is selected having dimensions such as 2 inches thickness×1 inch length (a first non-polar side 106 shown in the white-colored area or side in FIG. 4), which is wider than the figure sizes in the optical devices (1.5 inches×1 inch). In general, the magnet poles 102 (red-colored region) are not used for orienting particles in the optical device.

A magnet selected to have a higher surface field strength will reduce a response time for particle orientation (for example, a 4400 Gauss field strength magnet takes a few seconds to switch the color of letters in the optical devices). As shown in the exemplary embodiment of FIG. 4, the block magnet 100 configuration magnetizes through the thickness. The colors (red, white, and grey) are used to indicate three different areas among six sides of the magnet block; the red-colored area(s) 102 represents magnetic poles (only one pole is shown in FIG. 4), grey-colored region(s) are the second non-pole side 104 of thickness (>2 inches)×width (only one grey area is shown in FIG. 4), and white-colored side(s) is also the first non-pole side 106 of thickness (>2 inches)×length (>1 inch), where the width is a shortest length (<1 inch) (only one white area is shown in FIG. 4). In certain aspects, to achieve the most advantageous and proper operation orientation of particles, the non-pole white sides are used in proximity with the optical device to orient particles. Alternately, the non-pole grey region can be used if the width is longer than the length (>1 inch), but the red areas (magnet poles) are generally not desirable to be used regardless of the size or area of the pole.

Magnet Operation

The optical devices can be placed on a flat surface, such as boards, books, and desks with no paramagnetic materials (irons) nearby, so that the magnet operation has minimal interference and is not disturbed. The optical devices are placed in such a manner that at least one transparent wall can be seen to display the optic feature formed by the plurality of micro-particles.

In FIGS. 5A-5C, an optic display device 120 includes a force field generator for generating and transmitting a magnetic field that comprises magnet 122. The magnet 122 has a white-colored region 124 (thickness×length), in other words a non-pole side of the magnet 122. The white-colored region 124 can be gently positioned onto the top and around the middle of the features (see FIG. 5A). The magnet 122 further includes a second grey-colored region 124, in other words a second non-pole side.

In this embodiment, the red-colored sides 126 (magnetic poles) are not used for orientating a plurality of particles 130 contained in a display component 132 in the optic display device 120. The display component 132 comprises at least one transparent wall 136 through which the plurality of particles 130 are observed to define an optic feature 134. After waiting a few seconds (1-20 seconds), the magnet 122 can be removed from the display component 132 to observe "black" color in the optic feature 134 where the particles 130 are present.

If the magnetic particles 130 are not spread out (are aggregated) on the top of the display component 132 (see FIG. 5B), thus not covering all the area that is desired to define an optic feature 134 in the display component 132, any edge side of the magnet can approach the empty area so that the particles 130 spread evenly. This step can thus be repeated as necessary until all areas where particles are used to define an optical feature are evenly covered with the particles.

Optical Device Operation

In FIG. 5A, the white area 124 of magnet 122 is located along a top 140 of the display component 132. After removing the magnet 122 from the display component 132, "black" color in an optic feature 134 along transparent wall 136 of the display component 132 appears. Where necessary, the particles 130 can be spread evenly on the top surface 140 of optic features 134 in the display component 132 by approaching the empty surface with any edge part of the magnet. See FIG. 5B.

In an alternate embodiment, the magnet 122 can be placed on the flat area, where the white-colored sides 124 should be along the bottom and top (see FIG. 6), so that one of the white-colored sides 124 is disposed along the flat surface and the opposite white-colored side 124 is exposed. A bottom 142 and middle of the display component 132 can be gently located on the top of the exposed white-colored side 124 the magnet 122 (see FIG. 6). After a few seconds, e.g., 1-20 seconds, a "yellow" color can be observed in the optic feature 134 by the orientation of the internal particles 130 based on the magnetic field applied.

If necessary, shaking the display component 132 of the optic display device 120 in side-by-side manner while contacting or slightly above the magnet 122 can induce desirable particle spreading and the coloring or optic effect may be improved (yellow color). Either of the methods described above for inducing color change to "black" can be used to switch the yellow color back to a black color, namely by reversing the side on which the display component 132 contacts or interfaces with the magnet 122.

Example 3

A variety of magnetic anisotropic microparticles are prepared by modifying the methods described above in Examples 1 and 2. Such microparticles include microcylinders, microdisks, and microfibers. Precise engineering of compartmentalized microparticles, such as cylinders or disks, with a wide range of properties is achieved by adjusting a number of experimental parameters during electrohydrodynamic (EHD) co-jetting, including polymeric concentrations and applied voltages.

At first, two different jetting mixtures are prepared for each anisotropic microfiber production. Herein, three different anisotropic microfibers are produced from various combinations of magnetite and/or colorants (see Tables 1-3 below for the various compositional combinations of jetting solutions).

All jetting materials are dissolved in a solution of chloroform and DMF (95:5, v/v) with given final concentrations as shown in Tables 1-3. Poly(lactide-co-glycolide) (PLGA) with a lactide:glycolide ratio of 85:15 (MW 50,000-75,000 g/mol), a green fluorescence dye (poly[tris(2,5-bis(hexyloxy)-1,4-phenylenevinylene)-alt-(1,3-phenylenevinylene)]), chloroform, N,N-dimethylformamide (DMF), ethylene glycol, and Tween 20 and 80 are obtained from Sigma-Aldrich (St. Louis, Mo., USA). A red fluorophore (ADS306PT) is a product available from American Dye Source, Inc (Quebec, Canada). Titanium dioxide ($TiO_2$) and carbon black (CB) pigments are purchased from Tronox, Inc. (Oklahoma City, Okla., USA), and General Carbon Company (Paterson, N.J., USA), respectively. Yellow dye (high strength opaque yellow 14) is a product of GFS Chemicals (Powell, Ohio, USA). Magnetite ($Fe_3O_4$ nanocrystals in chloroform, 28 nm) is obtained from Ocean NanoTech LLC (Springdale, Ark., USA). All reagents are used as received without further purification. Block magnets (4"×1"×1" and 2"×1"×1" thick, NdFeB) are products of K&J Magnetics, Inc.

TABLE 1

Experimental conditions for electrohydrodynamic co-jetting to prepare bi-compartmentalized/biphasic magnetic microfibers having 20 μm average diameters.

|  | Green Phase/ Compartment | Red Phase/ Compartment |
|---|---|---|
| PLGA, w/v % | 26 | 26 |
| Functional components, w/v % | PTDPV, 0.01 | ADS306PT, 0.01 $F_3O_4$, 0.8 |
| Applied Voltage, kV | | 9 |
| Flow Rate, ml/h | | 0.03 |

TABLE 2

Experimental conditions for electrohydrodynamic co-jetting to prepare bi-compartmentalized/biphasic magnetic microfibers comprising white/black pigments in respective phases and having an average diameter of 200 μm.

|  | White Phase/ Compartment | Black Phase/ Compartment |
|---|---|---|
| PLGA, w/v % | 35 | 35 |
| Functional components, w/v % | $TiO_2$, 3.4 | CB, 2.6 $F_3O_4$, 1.0 |
| Applied Voltage, kV | | 10 |
| Flow Rate, ml/h | | 0.05 |

TABLE 3

Experimental conditions for electrohydrodynamic co-jetting to prepare bi-compartmentalized/biphasic magnetic microfibers having yellow/black colorants in respective phases with 200 μm average diameters.

|  | Yellow Phase/ Compartment | Black Phase/ Compartment |
|---|---|---|
| PLGA, w/v % | 35 | 35 |
| Functional components, w/v % | Yellow 14, 10 | CB, 2.6 $F_3O_4$, 1.0 |
| Applied Voltage, kV | | 9~10 |
| Flow Rate, ml/h | | 0.05 |

The two jetting suspensions are separately pumped through a dual capillary system (capillary diameter: two of 23 gauge; Nordson EFD, or two of 26 gauge; Hamilton) held together at side-by-side. The capillaries are connected to the cathode of a DC voltage source (Gamma High Voltage Research, USA) and the flow rate is controlled via a syringe pump (Kd Scientific, USA). A flat piece of aluminum foil is used as a counter electrode. The distance between the capillary tip and the substrate is maintained in the range of 10-15 cm. All experiments are performed at room temperature (23-25° C.). The two polymer solutions are delivered at a given flow rate with a driving voltage (see Tables 1-3 above). The resulting fibers are collected and dried under vacuum for overnight. The microfibers are solidified in a medium (Tissue-Tek O.C.T. Compound, Andwin Scientific, USA), then are mounted onto a cryostat chuck at −20° C., and are sectioned by a cryostat microtome (HM550 OMC, Microme) with a given length (10, 50 or 500 μm). The processed particles are suspended in an aqueous solution containing Tween 20 (2 v/v %) prior to use.

Example 4

The processes of electrohydrodynamic co-jetting described above in Example 3, including the microsectioning technique, are used to prepare bicompartmentalized magnetic microcylinders with pre-selected different aspect ratios. An electrohydrodynamic co-jetting system 300 comprises a first stream 302 and a second stream 304 for jetting together in a side-by-side setup. The first stream 302 comprises a green colorant (FITC) and PLGA polymer. The second stream 304 comprises a red colorant (TRITC), magnetite particles, and PLGA polymer. A plurality of aligned fibers 310 microfibers are solidified in a medium (not shown, but as described above) and then can be mounted onto a platform (e.g., a cryostat chuck) for automated sectioning. A sectioning apparatus 312 (e.g., a cryostat microtome) is used to cut sections 314 that can then be separated to form a plurality of microcylinder particles 320.

Hence, the isolated fiber bundles 310 are converted into microcylinders 320 with a predetermined and defined length ("l," in the schematic of FIG. 9A). FIG. 9B shows a micrograph overlaying FITC (green) from stream 302 and TRITC (red) fluorescence emission ranges from stream 304 obtained from confocal laser scanning microscopy (CLSM) showing a cross-sectional view of bicompartmentalized microfiber bundle (PLGA polymer) having a green fluorophore, and red fluorophore with magnetite in the red compartment; and an inset of a micrograph of transmission electron microscopy (TEM) showing the compartmentalization of the magnetite.

Figure 9D:
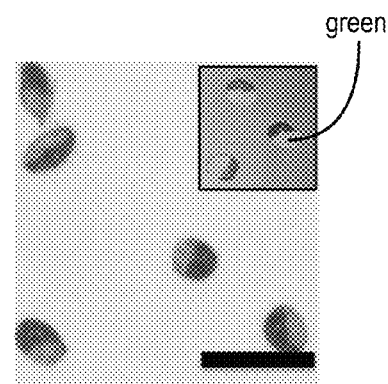
Figure 9E:
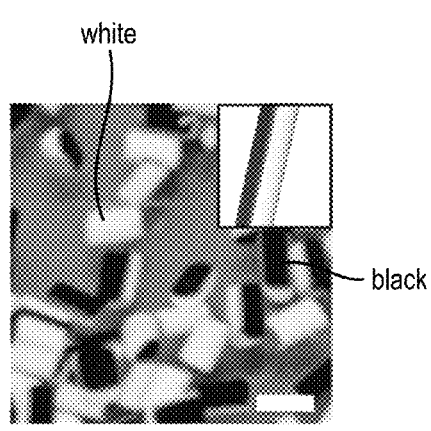
Figure 9F:
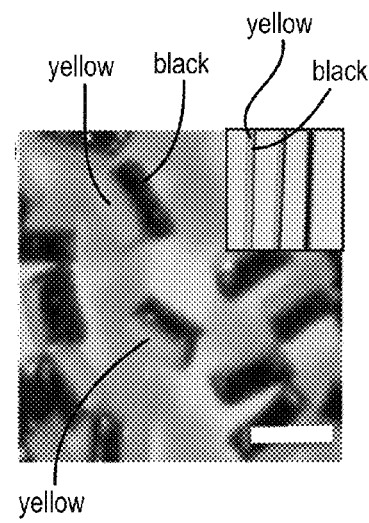

Various sized microcylinders composed of poly(lactic-co-glycolic acid) (PLGA), magnetite ($Fe_3O_4$, ~28 nm) and colorants ($TiO_2$/carbon black (CB) or Yellow 14/CB) are prepared as described above in Example 3 ranging from 10 to 250 μm in diameter and 10 to 500 μm in length (FIG. 9B to 9F). Both CB and magnetite are distributed in the same phase/compartment, while $TiO_2$ or Yellow pigment is loaded in the second, non-magnetic phase or compartment. FIG. 9C is a CLSM image of microcylinders (l=50 and d=20 μm) and optical microscopy (OM) image in the inset showing the first green phase from first stream 302 and second red phase from second stream 304 in each microcylinder. FIG. 9D is an OM image of microdisks (l=10 and d=20 μm) and CLSM micrograph overlaying the FITC and transmission channel in inset. FIG. 9E is a photograph of a water suspension of microcylinders (including $TiO_2$ and CB/magnetite respectively in each compartment; l=500 and d=250 μm) with a red background (paper), and corresponding microfiber in inset. FIG. 9F is a photograph of a water suspension of microcylinders (Yellow 14 and CB/magnetite respectively in each compartment; l=500 and d=250 μm), and its microfiber in inset.

Once a magnet is taken away or removed from an optical device or sample, the position of the plurality of particles becomes randomized, as shown FIGS. 9C-9F. The M-H hysteresis measurements indicate that the magnetic microcylinders have ferrimagnetism with very low residual inductions ($B_r$) at room temperature (0.03 and 0.01 emu/g, respectively corresponding to FIGS. 14 and 16), because the magnetite employed in the microcylinders are nano-sized (average 28 nm in diameter), thus, closely act as superparamagnetic particles.

More specifically, FIGS. 13-16 show M-H Hysteresis of the bicompartmentalized magnetic microcylinders determined by a SQUID magnetometer (Quantum Design) at rt: (FIG. 13) corresponding to the particles (l=50 and d=20 μm) shown in FIG. 1C, (FIG. 14) an enlarged graph of (FIG. 13) showing that the residual induction ($B_r$) is 0.03 emu/g, (FIG. 15) corresponding to the particles (l=500 and d=250 μm) shown in FIG. 9F, and (FIG. 16) a zoomed graph of (FIG. 15) exhibiting that $B_r$ is 0.01 emu/g.

In FIG. 10A, a plurality of anisotropic microcylinder shaped microparticles 330 comprise a magnetic material 332 in a first compartment or phase 334, while a second phase 336 is optically distinct. The first magnetic phase 334 in the magnetic anisotropic microcylinder shaped microparticles 330 forms a hemicylinder, where length is significantly greater than diameter (l>>d).

Figure 10F:
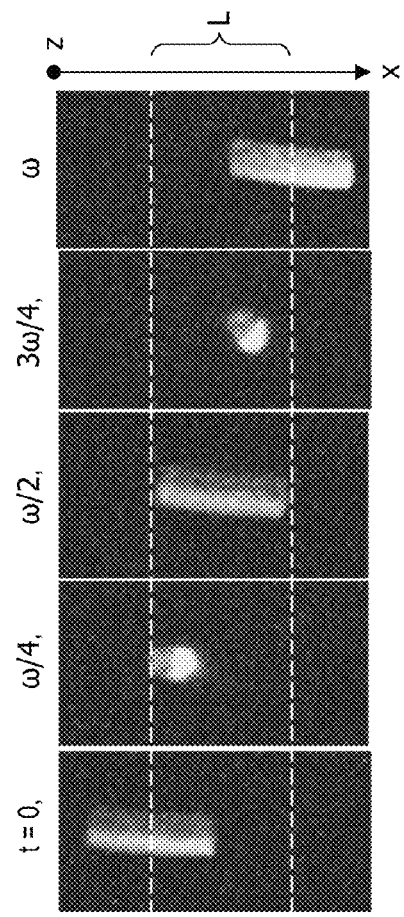
Figure 10E:
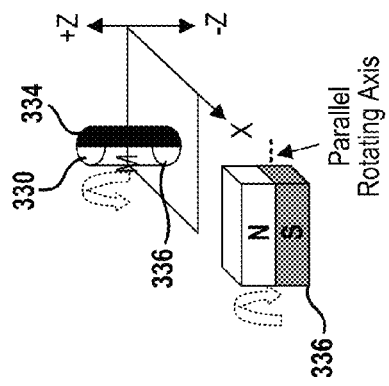
Figure 10G:
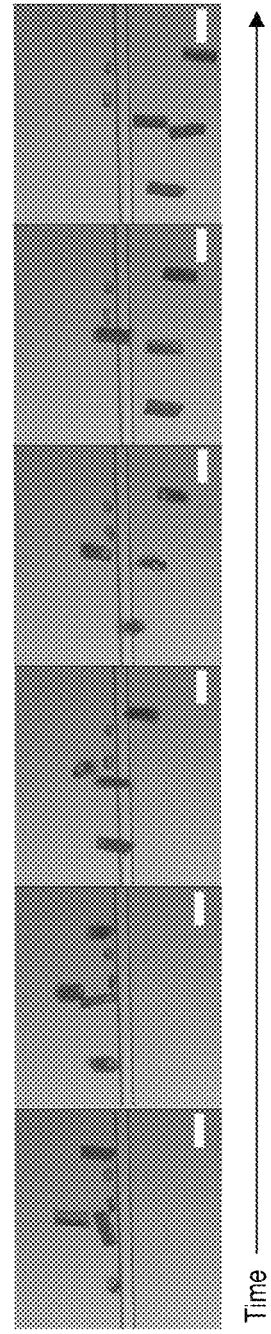

FIG. 10B is a CLSM micrograph of the microcylinders. FIGS. 10C and 10D show a schematic and CLSM image of anisotropic magnetic microcylinders that are standing up on a surface under a z-directional magnetic field. A 5 mT magnetic field is applied. FIG. 10E shows surface tumbling of the microcylinders under the influence of a rotating magnetic field. FIG. 10F is a series of CLSM images showing the tumbling motion of microcylinders (l=40 and d=13.5 μm) with an angular frequency (ω=~0.1 sec$^{-1}$) and translational displacement (L). FIG. 10G shows a time sequence of CLSM images indicating that a mixture of magnetic microcylinders (l=50 and d=20 μm)/microdisks (l=10 and d=20 μm) separate according to their aspect ratios when presented with a microbarrier (PLGA fiber, d=20 μm).

Thus, the microcylinders align with their longest axis (l) in the direction of an external field (FIGS. 10A-10D, 13-16, and 17A-17B). However, due to the rotational freedom along this axis, the compartmental or phase orientation is not synchronized. Rotation of a magnet 336 along the parallel axis causes a tumbling motion of the microcylinders 330 (FIGS. 10E and 10F). The translational displacement (L) per one cycle of magnetic field rotation (ω) during surface walking depends on an aspect-ratio of the microcylinders 330 (AR=L/D where L is length or the longest dimension and d is diameter). For instance, the L value of a microcylinder with l=40 μm and d=13.5 μm is measured to be 44 μm (for Lω~4.7 μm/sec, FIG. 10F).

For a given diameter, microcylinders with different lengths have different displacements, which can determine whether or not they can pass over a fixed-height barrier, such as a microfiber. FIG. 10O shows a mixture of microcylinders (dimensions of l=50 and 10 μm; d=20 μm) that are tumbling towards a PLGA microfiber with a height of 20 μm. Only the longer microcylinders are able to hop over the hurdle, while the shorter ones spin against the microfiber thereby allowing for quantitative separation of differently sized particles.

Dynamic coupling of shape and compositional anisotropy of multicompartmental/multiphasic microcylinders enables optically observable color changes, as shown in FIGS. 11A-11F. FIG. 11A shows a schematic for assembly of a plurality of magnetic microcylinders 350 in a staggered chain configuration under the influence of a parallel magnetic field (x-direction). A 20 mT magnetic field is applied. FIG. 11B is an OM image of the microcylinders at a higher concentration under the influence of the x-directional magnetic field. FIG. 11C is a CLSM micrograph of the microcylinders with a parallel magnet 352 configuration forming the staggered chains, while FIG. 11D is an OM image of the microcylinders under the influence of a z-directional magnetic field from magnet 354. FIG. 11E is a photograph of assembled microcylinders with yellow/black colors (as in FIG. 9F) in the direction of the magnetic field gradient. FIG. 11F is a photograph of the microcylinders after orthogonally rotating the magnet.

Hence, if the magnetic field is parallel to the xy-plane, microcylinders assemble into staggered chains (FIGS. 11A-11C), where the alternating arrangement of the magnetic compartments induce the maximal magnetic moment. This configuration corresponds to the nematic phase of liquid crystal (LC) materials. If the magnetic field is perpendicular (xz-, or yz-plane), the magnetic particles individually stand on the surface (FIGS. 10C and 11D) to minimize repulsion, which is more similar to the smectic phase in LC materials. The difference in surface coverage between these two phases yields distinguishable optical color changes (FIGS. 11E and 11F).

Previously, optical color switching of the magnetic anisotropic (e.g., biphasic Janus) particles required a combination of a magnetic field and a second force, such as an optical tweezer. However, full orientational control is realized by the present inventive technology for appropriately configured magnetically anisotropic microparticles, such as microcylinders, which can be induced by a single magnet only. FIG. 12A illustrates this concept.

FIG. 12A shows a schematic of color switching of the bicompartmentalized magnetic microcylinders, which is controlled by approaching a magnet from the z-direction. By approaching a microparticle 360 having a cylindrical shape with a magnet 362 from z-direction, while keeping the field parallel to the x-axis, a randomly positioned microcylinder (360—in position $S_1$) is thus aligned in the x direction (360—in position $S_2$). If the magnetophoretic force is greater than the dragging force and/or gravity, the particle will translate towards the magnet (360—in position $S_2$). At the same time, the potential energy difference between the magnetic and non-magnetic phases/compartments causes the magnetic compartment to rotate towards denser field lines (360—in position $S_3$). Thus, $S_1$ indicates a random state of the particles in the absence of the magnet, $S_2$ denotes a state where the longest axis of the microcylinder(s) is aligned in the direction of the magnetic field gradient, and the $S_3$-state signifies that the magnetic phase or compartment is facing in the direction of the magnetic field gradient after magnetophoresis.

As a result, the particle is switched and subsequently externally reveals an optically distinct phase corresponding to the color of the phase comprising the magnetic material (e.g., to the eye of an observer). FIG. 12B is an overhead view of a plurality of black phase/white phase colored microcylinders (FIG. 9E). Thus, the black/white colors encoded in the microcylinders (FIG. 9E) initially show a mixture of both colors in the absence of the external magnet (FIG. 12B), whereas the black color selectively appears at the top of device after applying the magnetic field (FIG. 12C).

This system can be further optimized by adjusting a density of a surrounding medium that is balanced to cancel out gravitational effects. Then, in certain variations, the magnetophoretic mobility ($m_m$) of the microcylinder will only depend on the properties of the magnetic microparticle and the surrounding medium (Equation 3), which equals the quotient of the particle velocity ($v_m$) and magnetophoretic driving force ($\nabla B^2/2\mu_0$).

$$m_m = \Delta\chi V_m/3\pi S_h\eta = v_m/(\nabla B^2/2\mu_0) \quad \text{Equation (3)}$$

where $\Delta\chi$ is the magnetic susceptibility difference between the magnetic microparticle and surrounding medium, $V_m$ is the occupied volume of magnetite in the microcylinder, $D_h$ is the hydraulic diameter of the microcylinder, $\nabla B$ is the magnetic gradient field, and $\mu_o$ is the permeability constant.

FIG. 18 shows magnetic mobility of the microcylinders (yellow/black pigmented particles) in a display, which is experimentally measured from the velocity ($v_m$) and the gradient magnetic field ($\nabla B^2/2\mu_0$). A dynamic viscosity ($\eta$) of a medium that is a mixture of ethylene glycol and Tween 80 (2/1, v/v) is measured to be 0.15 N·s/m² (TA Instrument Co, Rheometer AR1000). The medium density ($\rho_m$) is 1.08 g/ml, which is balanced to the density of magnetic microcylinder ($\rho_p$). Hence, two opposite forces (buoyant force and gravity) exerted on the particles are considered to be canceled out in such viscous medium. This regime of viscous force approximately leads to a laminar flow, thus a magnetophoretic force ($F_{drag}$) follows Stokes' law as described in Equation 5.

$$\vec{F}_{mag} = \frac{\Delta\chi}{2\mu_0} \cdot V_m \cdot \nabla \vec{B}^2 \quad \text{Equation (4)}$$

$$\vec{F}_{drag} = -3\pi \cdot D_h \cdot \eta \cdot \vec{v}_m \quad \text{Equation (5)}$$

where $\Delta\chi$ is the magnetic susceptibility difference in between the magnetic microparticle and surrounding medium, $V_m$ is the occupied volume of magnetite in the microcylinder, $\Delta B$ is a gradient magnetic field, $D_h$ is the hydraulic diameter of the microcylinder, and $v_m$ is the particle velocity. At a moment of $F_{mag}=-F_{drag}$, therefore, a normalized parameter, magnetophoretic mobility ($m_m$) can be derived from dividing the velocity ($v_m$) by magnetophoretic driving force ($\nabla B^2/2\mu_0$) as expressed by the following Equation 6.

$$m_m = \Delta\chi V_m/3\pi D_h\eta = v_m/(\nabla B^2/2\mu_0 \quad \text{Equation (6)}$$

Then, the $m_m$ value can be obtained by experimentally measuring $v_m$ and $\nabla B^2/2\mu_0$ in the system.

By varying a gradient field, the changed particle velocity is repeatedly measured. An average velocity of the microcylinders (yellow/black pigmented particles) is recorded by measuring times to reach 4 mm distance (from top to bottom of the optic display) at a given magnetophoretic force (2"×1"×1" thick magnet). By varying the magnet locations at several different distances from the display (ranged from 120 mT at 11 mm to 300 mT at 0 mm, measured by a magnetometer, F.W. Bell, 5180 Gauss Meter), the changed particle velocity is again documented. Several repeated experiments afforded the mean $m_m$=0.114 mm³/T·A·sec (FIG. 18).

Based on these findings, a simple magnetophoretic optical display device containing yellow and black-colored bicompartmental microcylinders can be formed (FIGS. 12D to 12F). A given optic feature is drawn on the double-sided tape (3M) and silicone (1/16" and 0.02" thick, McMaster Carr), respectively, using SolidWorks DWGeditor software. The tape and silicone are cut by printing the drawings in a vector mode via Epilog Zing 16 Laser. After a piece of double-sided tape is laminated onto a glass slide (bottom of the device, 25×75×1 mm), the silicone is treated with a high frequency generator (Electro-Technic Products, Inc., Model BD-20) attached on top of the double-sided tape. In this manner, another double-sided tape and silicone are added until reaching a desired height (e.g., about 2 to 4 mm).

Figure 12G:
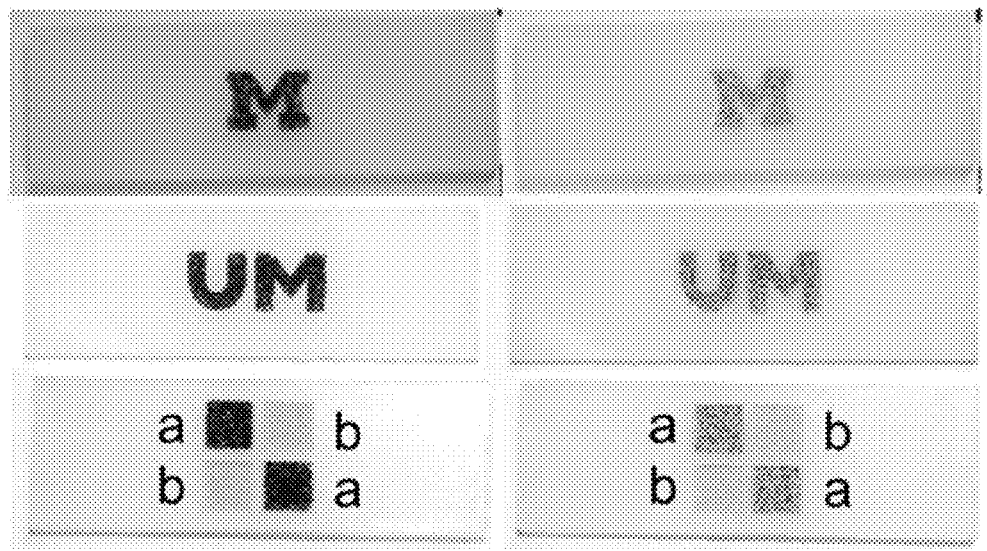

The prepared particles suspended in a mixture of ethylene glycol and Tween 80 (2:1, v/v) like those in Example 2 above are loaded into the given geometries in the device until the particles cover the surface. Another glass slide with the double-sided tape is sealed to the top of the device. Finally, the inside of the feature is fully filled with the medium by injecting through the wall of device using a syringe and needle. The feature dimensions of these devices are 18×18×4 (height) mm for the rectangular well and 10 (length)×2 (thickness of channel)×4 (height) mm for each letter. As shown in FIG. 12G, for example, a checkerboard (each well, 8×8×4 (height) mm) has yellow/black colored magnetic microcylinders (indicated as "a" in FIG. 12G) and only yellow colored microcylinders without magnetite ("b") as designated in FIG. 12G. FIG. 12G also shows a pattern with an "M" character and a "UM" character.

FIG. 12D is an overhead photograph of a plurality of yellow/black pigmented anisotropic microcylinder particles (like in FIG. 9F). An initial orientation of the plurality of microparticles is arbitrary in the absence of an external field (FIG. 12D). FIG. 12E is an overhead view of the optical device after surface switching, while FIG. 12F shows the same view when the magnet is disposed below the optical device. 50-300 mT magnetic fields are applied. Because of the positioning of a magnet either on the top or bottom of the device, the microcylinders are synchronized and reversibly switched between black (FIG. 12E) and yellow (FIG. 12F) colors. In addition, repeated operation gives rise to robust and reproducible appearance of two distinct colors (FIG. 12G), when the magnet is translated to a top of a device, and then to a bottom of the device.

As positioning a rectangular-shaped magnet near a solution of magnetic bicompartmentalized microcylinders that are placed on a microscope glass slide, the longer side (I) of microcylinders align in the same direction of magnetic field (FIGS. 17A-17B). Because of the magnetic shape anisotropy, a higher magnetic moment (M) along the direction of the longest axis (I) is favorably induced, where the demagnetization field ($H_d$) of the particles is minimized. However, the orientation of magnetic compartment along the I axis is random (FIGS. 17A-17B) due to rotational freedom, requiring a second force to control the compartmental orientation. In FIG. 17A, a rotating magnetic field along with the perpendicular axis (z axis) shows that a microcylinder ("M") revolves opposite to a direction of magnetic field (arrows indicated on magnet with north (N) and south (S) poles). FIG. 17B shows a time sequence of CLSM images (superimposed with transmission and FITC emission) demonstrating that a microcylinder spins clockwise by the rotating field anticlockwise along with the z axis. Meanwhile, changing a magnetic field direction along the Z axis (perpendicular rotating axis) generates a torque to the magnetite compartment (hemicylinder shape) to rotate (FIG. 17A), resulting in spinning of the microcylinder (FIG. 17B). This occurs because of a potential energy difference originating in the shape anisotropy.

In various aspects, the present disclosure pertains to optical display devices. For example, in one embodiment, an optical device comprises a display component. The display component comprises a plurality of anisotropic multiphasic particles that defines an optic feature. In certain variations, an optic feature may comprise multiple pre-selected, discrete regions having the plurality of anisotropic multiphasic particles, so that one or more complex patterns are created by the optic feature in the display device. The plurality of anisotropic multiphasic particles may be disposed in an optically transmissive fluid that permits transmission of light waves in certain ranges and further permits the external force field to penetrate and reach the plurality of anisotropic multiphasic particles. In certain variations, the plurality of anisotropic multiphasic particles may be contained in a layer within a plurality of layers. Furthermore, the display component preferably comprises at least one optically transmissive wall or layer that permits viewing of the optic feature contained inside the display component.

An anisotropic multiphasic particle of the plurality comprises a first phase and at least one additional phase distinct from the first phase. The first phase comprises a first colorant so that the anisotropic multiphasic particle defines optically distinct phases. In certain variations, the one or more additional phases comprise a second colorant distinct from the first colorant. At least one of the first phase or the one or more additional phases comprises a material receptive to a force field, so that the display component reversibly exhibits a first optical state in the presence of the force field.

In various aspects, the optical device also comprises a force field generator that generates and transmits the force field to the display component. The force field is optionally selected from the group consisting of: an electric field, a magnetic field, pressure, sonication, light, and combinations thereof.

In certain variations, the present disclosure provides a magnetically switchable optical device. The magnetically switchable optical device comprises a display component that comprises a plurality of anisotropic multiphasic particles that define an optic feature. In certain variations, an optic feature may comprise multiple pre-selected, discrete regions having the plurality of anisotropic multiphasic particles, so that one or more complex patterns are created by the optic feature in the display device. An anisotropic multiphasic particle of the plurality of anisotropic multiphasic particles comprises a first phase and at least one additional phase distinct from the first phase. The first phase of the anisotropic multiphasic particle comprises a first colorant, so as to define optically distinct phases. In certain variations, the one or more additional phases comprise a second colorant distinct from the first colorant, which forms two optically distinct phases. Further, at least one of the first phase and the one or more additional phases comprises a magnetic material receptive to a magnetic force field, so that the display component reversibly exhibits a first optical state in the presence of the magnetic force field.

The magnetically switchable optical device further comprises a force field generator comprising at least one permanent magnet that generates and transmits a magnetic field to the display component. In certain aspects, the display component comprises a first side and a second side opposite to the first side. The magnet is translatable from a first position to a second position. The first position is adjacent to the first side of the display component for inducing the first optical state. The second position is adjacent to the second side for inducing a second optical state distinct from the first optical state. Thus, the device can selectively control the particles from the first optical state to the second optical state. It should be noted that in certain aspects, the magnetic field may be selectively directed to only certain regions of the optic feature in the display component, so that certain regions of the optic feature have the first optical state, while other regions of the optic feature may still be in a distinct second optical state.

In certain aspects, a non-pole surface of the magnet is disposed adjacent to the first side or the second side of the display component. As noted above, the display component preferably comprises a housing having at least one optically transparent wall or layer. In certain variations, the housing comprises of contains a plurality of layers and the optic feature is formed in at least one of the plurality of layers.

In other variations, methods of operating an optical device, such as the magnetically switchable optical device having the features discussed just above are provided. In certain variations, the methods of operating an optical display device may comprise transmitting a magnetic force field to a display component that comprises a plurality of anisotropic multiphasic particles disposed in one or more regions that define an optic feature. As discussed just above, the anisotropic multiphasic particle comprises a first phase and at least one additional phase distinct from the first phase. The first phase comprises a first colorant and the at least one additional phase comprises a second colorant distinct from the first colorant, thus forming an anisotropic multiphasic particle having optically distinct phases. Furthermore, at least one of the first phase and the at least one additional phase comprises a magnetic material receptive to the magnetic force field. Thus, during or after the transmitting of the magnetic force field the display component reversibly exhibits a first optical state. In this manner, new optical display devices and methods of operating such optical display devices are provided that have high resolution, full orientational control, and simple, efficient techniques for operating and controlling display features.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A magnetically switchable optical device comprising:
   a display component that defines an optic feature and comprises a housing having a first side, a second opposite side, and an interior comprising a plurality of anisotropic multiphasic particles, each respective anisotropic multiphasic particle comprising a first phase and at least one additional phase distinct from the first phase, wherein the first phase comprises a first colorant so that the anisotropic multiphasic particle has optically distinct phases and at least one of the first phase or the at least one additional phase comprises a magnetic material receptive to a magnetic field; and
   a magnetic field generator comprising a magnet disposed external to the housing, wherein the magnet has a non-pole surface that is translatable from a first position adjacent to the first side of the housing of the display component for inducing orientation of the plurality of anisotropic multiphasic particles in a first optical state to a second position adjacent to the second opposite side for inducing orientation of the plurality of anisotropic multiphasic particles to a second optical state distinct from the first optical state.

2. The optical device of claim 1, wherein the at least one additional phase comprises a second colorant distinct from the first colorant.

3. The optical device of claim 2, wherein the at least one additional phase further comprises a second phase and a third phase, wherein the second phase comprises the second colorant, and the third phase comprises a third colorant, wherein the first, second, and third colorants are distinct from one another.

4. The optical device of claim 1, wherein the housing has at least one optically transparent wall, wherein the housing further contains a plurality of layers, wherein the optic feature is formed in at least one of the plurality of layers.

5. The optical device of claim 1, wherein the anisotropic multiphasic particle has a shape selected from the group consisting of: spheres, rectangles, polygons, disks, ellipsoids, toroids, cones, pyramids, rods, cylinders, beads-on-a-string, and fibers.

6. The optical device of claim 1, wherein the first colorant is selected from the group of materials consisting of: a low-molecular weight dye, a laser dye, a textile dye, a paint dye, a paint pigment, a coating dye, a coating pigment, a plastic colorant, a metal colorant, a ceramic colorant, a fluorescent dye, a phosphorescent dye, a natural dye, a polymeric dye, an inorganic pigment, an organic pigment, and combinations thereof.

7. A magnetically switchable optical device comprising:
a display component that defines an optic feature and comprises a housing having a first side, a second opposite side, and an interior comprising a suspension of a plurality of anisotropic multiphasic particle having a shape selected from the group consisting of: rods, cylinders, and fibers, each respective anisotropic multiphasic particle comprising a first phase and at least one additional phase distinct from the first phase, wherein the first phase comprises a first colorant and the at least one additional phase comprises a second colorant, so that the anisotropic multiphasic particle has optically distinct phases and at least one of the first phase or the at least one additional phase comprises a magnetic material receptive to a magnetic field; and
a magnetic field generator comprising a magnet disposed external to the housing, wherein the magnet has a non-pole surface that is translatable from a first position adjacent to the first side of the housing of the display component for inducing a first optical state by synchronizing the position of the plurality of anisotropic multiphasic particles via magnetophoresis to a second position adjacent to the second opposite side for inducing a second optical state distinct from the first optical state via magnetophoresis.

8. The magnetically switchable optical device of claim 7, wherein the at least one additional phase comprises a second colorant distinct from the first colorant.

9. The magnetically switchable optical device of claim 7, wherein the magnet is a permanent magnet that generates and transmits a magnetic field to the housing of the display component.

10. The magnetically switchable optical device of claim 7, wherein the housing has at least one optically transparent wall, wherein the housing further contains a plurality of layers, wherein the optic feature is formed in at least one of the plurality of layers.

11. The magnetically switchable optical device of claim 7, wherein the anisotropic multiphasic particle of the plurality of anisotropic multiphasic particles is a first anisotropic multiphasic particle and the plurality of anisotropic multiphasic particles further comprises at least one additional optically distinct anisotropic multiphasic particle also comprising a magnetic material receptive to the magnetic force field.

12. The magnetically switchable optical device of claim 11, wherein the at least one additional distinct anisotropic multiphasic particle comprises a phase having a third colorant distinct from the first colorant and the second colorant.

13. The magnetically switchable optical device of claim 7, wherein the first colorant comprises a material selected from a low-molecular weight dye, a laser dye, a textile dye, a paint dye, a paint pigment, a coating dye, a coating pigment, a plastic colorant, a metal colorant, a ceramic colorant, a fluorescent dye, a phosphorescent dye, a natural dye, a polymeric dye, an inorganic pigment and/or an organic pigment.

* * * * *